United States Patent
Hsieh et al.

(10) Patent No.: US 11,394,497 B2
(45) Date of Patent: Jul. 19, 2022

(54) HYBRID AUTOMATIC REPEAT REQUEST (HARQ) ENHANCEMENTS

(71) Applicant: Acer Incorporated, New Taipei (TW)

(72) Inventors: Chia-Wen Hsieh, Chiayi (TW); Chien-Min Lee, Taoyuan (TW)

(73) Assignee: ACER INCORPORATED, New Taipei (TW)

( * ) Notice: Subject to any disclaimer, the term of this patent is extended or adjusted under 35 U.S.C. 154(b) by 231 days.

(21) Appl. No.: 16/837,591

(22) Filed: Apr. 1, 2020

(65) Prior Publication Data
US 2020/0322097 A1    Oct. 8, 2020

Related U.S. Application Data

(60) Provisional application No. 62/828,493, filed on Apr. 3, 2019.

(51) Int. Cl.
*H04B 7/00* (2006.01)
*H04L 1/18* (2006.01)
*H04W 72/12* (2009.01)

(52) U.S. Cl.
CPC .......... *H04L 1/1854* (2013.01); *H04L 1/1864* (2013.01); *H04W 72/1273* (2013.01); *H04W 72/1289* (2013.01)

(58) Field of Classification Search
None
See application file for complete search history.

(56) References Cited

U.S. PATENT DOCUMENTS

| 2018/0124753 | A1* | 5/2018 | Sun | H04W 72/042 |
|---|---|---|---|---|
| 2019/0103947 | A1* | 4/2019 | Park | H04L 1/1812 |
| 2020/0044792 | A1* | 2/2020 | Vaidya | H04L 1/1812 |
| 2020/0145169 | A1* | 5/2020 | Zhou | H04L 5/0055 |
| 2020/0314948 | A1* | 10/2020 | Babaei | H04L 1/1896 |
| 2020/0374045 | A1* | 11/2020 | Yin | H04W 72/042 |
| 2021/0321446 | A1* | 10/2021 | Lee | H04W 72/1289 |
| 2021/0410124 | A1* | 12/2021 | Chen | H04W 72/0453 |

OTHER PUBLICATIONS

European Patent Office; Extended European Search Report from corresponding EP Application No. 20167571.7 dated Aug. 28, 2020; pp. 1-12; Published: EP.
Intel Corporation; "Enhancements to HARQ for NR-unlicensed"; 3GPP TSG RAN WG1 Meeting #96bis; Xi'an, China; Apr. 8-12, 2019.
Spreadtrum Communications; "Discussion on HARQ enhancements in NR-U"; 3GPP TSG RAN WG1 Ad-Hoc Meeting 1901; Taipei; Jan. 21-25, 2019.
ZTE, Sanechips; "Discussion on scheduling and HARQ for NR-U"; 3GPP TSG RAN WG1 #96bis; Xi'an, China; Apr. 8-12, 2019.

* cited by examiner

*Primary Examiner* — Phirin Sam
(74) *Attorney, Agent, or Firm* — Polsinelli LLP

(57) ABSTRACT

A user equipment (UE) receives physical downlink shared channel (PDSCH) in a downlink slot as scheduled using a downlink control indicator (DCI). The UE identifies that the downlink slot is part of a group of downlink slots based on the DCI and/or another DCI corresponding to the group. The UE identifies one or more uplink slots at which to transmit hybrid automatic repeat request (HARQ) feedback corresponding to the slots in the group, and transmits the HARQ feedback at one of these uplink slots. If HARQ feedback is not received, a semi-static codebook may prevent HARQ payload size misalignment.

40 Claims, 30 Drawing Sheets

← 150

| Value 160 of 'Subframe configuration for LAA' field in current subframe | Configuration 170 of occupied OFDM symbols (current subframe, next subframe) |
|---|---|
| 0000 | (-, 14) |
| 0001 | (-, 12) |
| 0010 | (-, 11) |
| 0011 | (-, 10) |
| 0100 | (-, 9) |
| 0101 | (-, 6) |
| 0110 | (-, 3) |
| 0111 | (14, *) |
| 1000 | (12, -) |
| 1001 | (11, -) |
| 1010 | (10, -) |
| 1011 | (9, -) |
| 1100 | (6, -) |
| 1101 | (3, -) |
| 1110 | reserved |
| 1111 | reserved |

NOTE 180:
- (-, Y) means UE may assume the first Y OFDM symbols are occupied in next subframe and other OFDM symbols in the next subframe are not occupied.
- (X, -) means UE may assume the first X OFDM symbols are occupied in current subframe and other OFDM symbols in the current subframe are not occupied.
- (X, *) means UE may assume the first X OFDM symbols are occupied in current subframe, and at least the first OFDM symbol of the next subframe is not occupied.

| PDSCH-to-HARQ_feedback timing indicator 410 ||| Number of slots k1 for DCI format 1_1 420 | Number of slots k1 for DCI format 1_0 430 |
| --- | --- | --- | --- | --- |
| 1 bit 440 | 2 bits 450 | 3 bits 460 | | |
| 0 | 00 | 000 | 1st value in dl-DataToUL-ACK | 1 |
| 1 | 01 | 001 | 2nd value in dl-DataToUL-ACK | 2 |
|   | 10 | 010 | 3rd value in dl-DataToUL-ACK | 3 |
|   | 11 | 011 | 4th value in dl-DataToUL-ACK | 4 |
|   |    | 100 | 5th value in dl-DataToUL-ACK | 5 |
|   |    | 101 | 6th value in dl-DataToUL-ACK | 6 |
|   |    | 110 | 7th value in dl-DataToUL-ACK | 7 |
|   |    | 111 | 8th value in dl-DataToUL-ACK | 8 |

*FIG. 4*

| PDSCH-to-HARQ_feedback timing indicator 1215 | Number of slots (k1) 1220 |
|---|---|
| '000' | 8 |
| '001' | 12 |
| '010' | 16 |
| '011' | 20 |
| '100' | 24 |
| '101' | 28 |
| '110' | 32 |
| '111' | N/A |

Table 1210

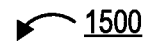

1500

Receive a first downlink control information (DCI), the first DCI scheduling a first physical downlink shared channel (PDSCH) in a first downlink slot that is within a first slot group, wherein the first DCI includes a first slot group indicator identifying the first slot group and a first *PDSCH-to-HARQ_feedback timing indicator*
1505

Receive, during a first downlink slot, the first PDSCH as scheduled according to the first DCI
1510

Determine, based on the first PDSCH-to-HARQ_feedback timing indicator, that a first hybrid automatic repeat request (HARQ) feedback information corresponding to the first PDSCH is to be transmitted in a first uplink slot
1515

Transmit the first HARQ feedback information corresponding to the first PDSCH in the first uplink slot
1520

Table 2410

|    | DL HARQ process number |
|----|------------------------|
| 00 | 0,1,2,3,4,5,6,7        |
| 01 | 4,5,6,7,8,9,10,11      |
| 10 | 8,9,10,11,12,13,14,15  |
| 11 | 12,13,14,15,0,1,2,3    |

HYBRID AUTOMATIC REPEAT REQUEST (HARQ) ENHANCEMENTS

CROSS-REFERENCE TO RELATED APPLICATION

The present application claims the priority benefit of U.S. provisional application No. 62/828,493 filed Apr. 3, 2019, titled "HARQ Enhancements for NR-U," the disclosure of which is incorporated herein by reference.

FIELD

The present disclosure generally relates to systems, methods, and related communication devices used in wireless communication systems, and more particularly, to techniques of enhancing hybrid automatic repeat request (HARQ) procedures in the context of new radio (NR) based technology in unlicensed spectrum (NR-U).

BACKGROUND

A long-term evolution (LTE) system supporting the 3rd Generation Partnership Project (3GPP) Rel-8 standard and/or the 3GPP Rel-9 standard were developed by the 3GPP as a successor to the universal mobile telecommunication system (UMTS). The LTE system was developed for further enhancing performance of the UMTS to satisfy increasing needs of users. The LTE system includes a new radio interface and a new radio network architecture that provides high data rate, low latency, packet optimization, and improved system capacity and coverage. In the LTE system, a radio access network known as an evolved universal terrestrial radio access network (E-UTRAN) includes multiple evolved Node-Bs (eNBs) for communicating with multiple user equipments (UEs), and for communicating with a core network including a mobility management entity (MME), a serving gateway, etc., for Non-Access Stratum (NAS) control.

An LTE-advanced (LTE-A) system, as its name implies, is an evolution of the LTE system. The LTE-A system targets faster switching between power states, improves performance at the coverage edge of an eNB, and includes advanced techniques, such as carrier aggregation (CA), coordinated multipoint (COMP) transmissions/reception, uplink (UL) multiple-input multiple-output (UL-MIMO), etc. For a UE and an eNB to communicate with each other in the LTE-A system, the UE and the eNB must support standards developed for the LTE-A system, such as the 3GPP Rel-10 standard or later versions.

A fifth generation (5G) system (5GS) (e.g., 5G new radio access network (5G-NR)) is an evolution of a continuous mobile broadband process to meet the requirements of 5G as introduced by International Mobile Telecommunications (IMT)-2020. The 5GS may include a radio access network (RAN) and a core network (CN). The RAN may include at least one base station (BS). The at least one BS may include an evolved Node-B (eNB) or a 5G Node-B (gNB), for communicating with at least one UE and for communicating with the CN. The CN may include a MME, a signaling gateway (SGW), an access and mobility management function (AMF), a user plane function (UPF), and/or other architecture components for a NAS control.

In a LTE, LTE-A, or 5G system, time is divided into frames, with each frame lasting ten milliseconds (ms). Each frame includes ten subframes that each last one millisecond. Each subframe is divided into multiple slots. In LTE and LTE-A systems, each subframe is divided into two slots, with each slot being half a millisecond in length. In 5G new radio (NR) systems, the number of slots in a subframe may vary depending on subcarrier spacing (SCS). In 5G NR, SCS of 15 kilohertz (kHz), 30 kHz, 60 kHz, 120 kHz, and 240 kHz are supported. For a SCS of 15 kHz, each subframe includes only one slot that, like the subframe, lasts one millisecond. For a SCS of 30 kHz, each subframe includes two slots, with each of the two slots lasting 0.5 ms. For a SCS of 60 kHz, each subframe includes four slots, with each slot lasting 0.25 ms. For a SCS of 120 kHz, each subframe includes eight slots, with each slot lasting 0.125 ms. For a SCS of 240 kHz, each subframe includes sixteen slots, with each slot lasting 0.0625 ms.

Hybrid automatic repeat request (HARQ) is a combination of high-rate forward error-correcting coding and ARQ error-control. In a LTE, LTE-A, or 5G system, when a UE receives the DL data (e.g. downlink transport block) over a physical downlink shared channel (PDSCH) (during a DL slot or symbol), the UE typically transmits a downlink HARQ feedback information (during a UL slot or symbol) afterward. If the UE has correctly decoded a downlink transport block for a particular DL transmission, the HARQ feedback information transmitted corresponding to the downlink transport block may be an acknowledgment (ACK); otherwise, the HARQ feedback information transmitted may be a negative acknowledgment (NACK). The relative timing between receipt by the UE of the DL data over PDSCH and transmission by the UE of the corresponding HARQ feedback information is based on a PDSCH-to-HARQ_feedback timing indicator field in a downlink control information (DCI). However, the PDSCH-to-HARQ_feedback timing indicator field, and the way it is used, limits the number of timing values that can be used to represent the relative timing between receipt by the UE of the DL data over PDSCH and transmission by the UE of the corresponding HARQ feedback information so that some values cannot be represented. Especially for higher SCS values that result in higher number of slots per subframe, this inapplicability to represent certain timing values can result in failure by the UE to properly transmit HARQ feedback information, inefficiency due to unnecessary retransmission of downlink data to the UE, inefficient scheduling, and potential loss of access to the medium.

SUMMARY

Techniques and systems are described herein for hybrid automatic repeat request (HARQ) configuration. For instance, in some examples, a user equipment (UE) can receive downlink data via physical downlink shared channel (PDSCH) in a downlink slot as scheduled using a downlink control indicator (e.g., an indicator included in a field of a downlink control information (DCI) message received by the UE). The UE can identify that the downlink slot is part of a group of downlink slots based on the downlink control indicator and/or another downlink control indicator corresponding to the group of downlink slots. The UE can identify one or more uplink slots at which to transmits hybrid automatic repeat request (HARQ) feedback (e.g., acknowledgment) corresponding to the slots in the group, and can transmit the HARQ feedback information to a gNB using one of the identified uplink slots. In some cases, if HARQ feedback information for any group of downlink slots is not received by the gNB, a semi-static codebook for that group of downlink slots may prevent misalignment in HARQ payload size sent by the UE versus HARQ payload size expected by the gNB.

In one example, a method of hybrid automatic repeat request (HARQ) configuration by a user equipment (UE) is provided. The method includes receiving a first downlink control information (DCI), the first DCI scheduling a first physical downlink shared channel (PDSCH) in a first downlink slot that is within a first slot group. The first DCI includes a first slot group indicator identifying the first slot group and a first PDSCH-to-HARQ_feedback timing indicator. The method also includes receiving, during the first downlink slot, the first PDSCH as scheduled according to the first DCI. The method also includes determining, based on the first PDSCH-to-HARQ_feedback timing indicator, that a first hybrid automatic repeat request (HARQ) feedback corresponding to the first PDSCH is to be transmitted in a first uplink slot. The method also includes transmitting the first HARQ feedback information corresponding to the first PDSCH in the first uplink slot.

In another example, another method hybrid automatic repeat request (HARQ) configuration by a user equipment (UE) is provided. The method includes receiving a first downlink control information (DCI), the first DCI scheduling a first physical downlink shared channel (PDSCH) in a first downlink slot. The method also includes receiving the first PDSCH in the first downlink slot as scheduled according to the first DCI. The method also includes determining that the first downlink slot is included in a first group of downlink slots. The method also includes determining, based on the first DCI, that a first HARQ feedback information corresponding to the first PDSCH is to be transmitted in a first uplink slot that is included in a first group of uplink slots. The method also includes transmitting the first HARQ feedback information corresponding to the first PDSCH in the first uplink slot.

In another example, an apparatus for hybrid automatic repeat request (HARQ) configuration is provided. The apparatus includes one or more receivers and one or more transmitters. The apparatus also includes a memory storing instructions and a processor executing the instructions. Execution of the instructions by the processor causes the processor to perform system operations. The system operations include receiving, using the one or more receivers, a first downlink control information (DCI), the first DCI scheduling a first physical downlink shared channel (PDSCH) in a first downlink slot that is within a first slot group. The first DCI includes a first slot group indicator identifying the first slot group and a first PDSCH-to-HARQ_feedback timing indicator. The system operations also include receiving, during the first downlink slot and using the one or more receivers, the first PDSCH as scheduled according to the first DCI. The system operations also include determining, based on the first PDSCH-to-HARQ_feedback timing indicator, that a first hybrid automatic repeat request (HARQ) feedback corresponding to the first PDSCH is to be transmitted in a first uplink slot. The system operations also include transmitting, using the one or more transmitters, the first HARQ feedback information corresponding to the first PDSCH in the first uplink slot.

In another example, another apparatus for hybrid automatic repeat request (HARQ) configuration is provided. The apparatus includes one or more receivers and one or more transmitters. The apparatus also includes a memory storing instructions and a processor executing the instructions. Execution of the instructions by the processor causes the processor to perform system operations. The system operations include receiving, using the one or more receivers, a first downlink control information (DCI), the first DCI scheduling a first physical downlink shared channel (PDSCH) in a first downlink slot. The system operations also include receiving, using the one or more receivers, the first PDSCH in the first downlink slot as scheduled according to the first DCI. The system operations also include determining that the first downlink slot is included in a first group of downlink slots. The system operations also include determining, based on the first DCI, that a first HARQ feedback information corresponding to the first PDSCH is to be transmitted in a first uplink slot that is included in a first group of uplink slots. The system operations also include transmitting, using the one or more transmitters, the first HARQ feedback information corresponding to the first PDSCH in the first uplink slot.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following figures:

FIG. 1B is a table mapping values of the "Subframe configuration for license assisted access (LAA)" field in the DCI into configurations of occupied OFDM symbols;

FIG. 4 is a table mapping values in a PDSCH-to-HARQ_feedback timing indicator field to numbers of slots in a dl-DataToUL-ACK list.

FIG. 15A illustrates a first set of operations for HARQ configuration.

FIG. 21 illustrates padding of the semi-static codebook with NACKs, and compaction of the semi-static codebook using a logical AND.

FIG. 22 illustrates padding of the semi-static codebook with ACKs, and compaction of the semi-static codebook using a logical AND.

DETAILED DESCRIPTION

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

The unlicensed 5 GHz frequency band may be used by 5G systems as well as by certain variants of LTE and LTE-A systems. These variants of LTE and LTE-A systems may include LTE in Unlicensed spectrum (LTE-U), License Assisted Access (LAA), enhanced LAA (eLAA), further enhanced LAA (feLAA), MulteFire, or combinations thereof.

Figure 1A:
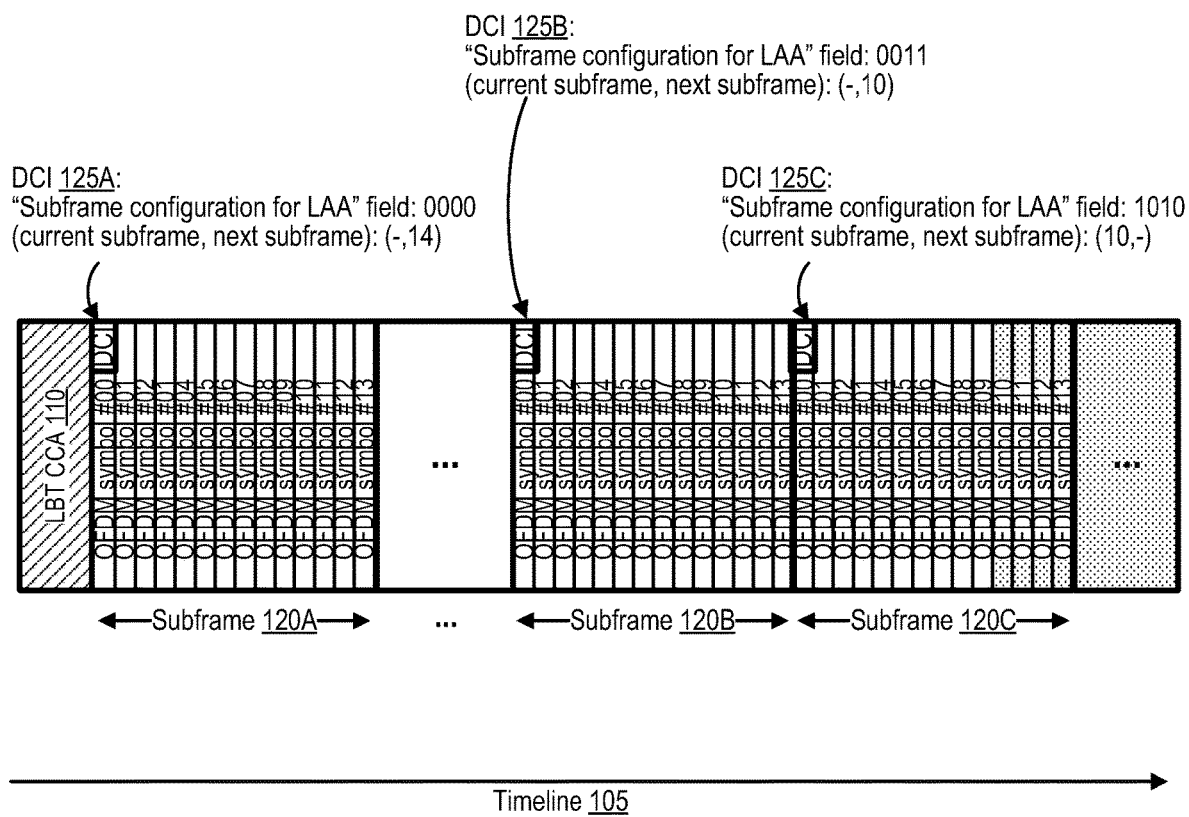
FIG. 1A illustrates a channel occupancy time (COT) structure based on "Subframe configuration for license assisted access (LAA)" field in downlink control information (DCI) when listen-before-talk (LBT) procedure/clean channel assessment (CCA) check is successful before the COT.

FIG. 1A illustrates a channel occupancy time (COT) structure based on "Subframe configuration for license assisted access (LAA)" field in downlink control information (DCI) when listen-before-talk (LBT) procedure/clean channel assessment (CCA) check is successful before the COT.

In a 5G NR-U system, the listen-before-talk (LBT) procedure is a mechanism by which a device, such as a UE or a gNB, applies a clear channel assessment (CCA) check, which uses energy detection (ED) for a particular channel to detect presence (e.g., the channel is busy) or absence (e.g., the channel is idle) of other signals on the channel. If the detected energy is lower than a predetermined ED threshold, the channel is "idle enough" for the device to access the channel for a period referred to as a channel occupancy time (COT). Otherwise, the device continues to perform CCA checks until channel access is granted. In some cases, the COT is limited to a maximum COT (MCOT), which represents the maximum continuous time that a device can use the channel after having been granted access following the CCA check. In some cases, the MCOT is 2 ms, 4 ms, 6 ms, 8 ms, 9 ms, or 10 ms. Variants of the 5G NR-U system, in the future or otherwise, could potentially have a wide range of potential time values for the MCOT, such as 1 ms, 2 ms, 3 ms, 4 ms, 5 ms, 6 ms, 7 ms, 8 ms, 9 ms, 10 ms, 11 ms, 12 ms, 13 ms, 14 ms, 15 ms, 16 ms, 17 ms, 18 ms, 19 ms, 20 ms, 21 ms, 22 ms, 23 ms, 24 ms, 25 ms, a time value greater than 25 ms, or a non-integer time value in between any two of the values listed here.

In LTE, LTE-A, 5G NR and 5G NR-U systems, each subframe and each slot are further divided into a number of orthogonal frequency-division multiplexing (OFDM) symbols. OFDM symbols are the smallest unit of time that is configurable by these systems. In 5G NR and NR-U systems, the number of OFDM symbols per slot may vary, but may be 14 in the case of normal cyclic prefix (CP), 12 in the case of extended CP. For quick delivery of low-latency payloads, 5G NR and NR-U systems can sometimes use mini-slots with 7, 4, or 2 OFDM symbols. The number of OFDM symbols per slot generally does not change based on the SCS or numerology. In LTE-time division duplexing (LTE-TDD) and LTE-A systems, each subframe is configured based on an uplink/downlink (UL/DL) configuration to be a downlink (DL), uplink (UL), or special (S) subframe. In 5G NR and NR-U systems, UL and DL assignment is configured at the OFDM symbol level rather than the subframe or slot level. Each OFDM symbol is configured as downlink (D), uplink (U), or flexible (X). In some subframes or slots, every OFDM symbol in the subframe or slot is of a single type, namely downlink (D), uplink (U), or flexible (X). Other subframes or slots may include a combination of different types of OFDM symbols, including D symbols and/or U symbols and/or X symbols.

The diagram 100 of FIG. 1A illustrates a timeline 105, with time moving from left to right. At the beginning of the timeline, an LBT CCA 110 is begun, as illustrated as a box with diagonal stripes. The LBT CCA 110 is used to determine a length of the COT. Following the start of the LBT CCA 110, three subframes 120 are illustrated, namely a first subframe 120A, a second subframe 120B, and a third subframe 120C. A gap of one or more subframes, denoted by a box with an ellipsis (" . . . "), is present between the first subframe 120A and the second subframe 120B. One or more subframes may be present after the third subframe 120C, again denoted by a box with an ellipsis (" . . . ").

Each subframe 120 of the subframes 120A-C of the diagram 100 includes 14 OFDM symbols. The OFDM symbols in each subframe 120 are labeled with consecutive OFDM symbol numbers, starting from "OFDM symbol #00" at the beginning of each subframe 120 and iterating up to "OFDM symbol #13" at the end of each subframe 120. The first subframe 120A the second subframe 120B, and the one or more subframes in between the first subframe 120A the second subframe 120B include only downlink OFDM symbols, and as such are illustrated with a white background that the legend 140 indicates represents downlink symbols. The third subframe 120C, however, includes a mixture of downlink OFDM symbols and uplink OFDM symbols. More specifically, OFDM symbols 00 through 09 of the third subframe 120C are downlink OFDM symbols, and as such are illustrated with the white background that the legend 140 indicates represents downlink symbols. OFDM symbols 10 through 13 of the third subframe 120C are uplink OFDM symbols, and as such are illustrated with the shaded background that the legend 140 indicates represents uplink symbols. The one or more subframes following the third subframe 120C likewise include one or more uplink OFDM symbols, and as such are illustrated with the shaded background that the legend 140 indicates represents uplink symbols.

The UE receives a DCI 125 at the earliest OFDM symbol (OFDM symbol #00) of each of subframes 120A-C. For example, the UE receives DCI 125A at OFDM symbol #00 of subframe 120A, DCI 125B at OFDM symbol #00 of subframe 120B, and DCI 125C at OFDM symbol #00 of subframe 120C. In some cases, the UE may receive each DCI 125 at the earliest OFDM symbol of a slot instead of the earliest OFDM symbol of a subframe as illustrated in the diagram 100. In some cases, the UE may receive each DCI 125 at an OFDM symbol other than the earliest OFDM symbol within each subframe or slot.

The DCI may be received by the UE over the physical downlink control channel (PDCCH). The cyclic redundancy check (CRC) bits of each DCI may be scrambled by a radio network temporary identifier (RNTI), such as a common control radio network temporary identifier (CC-RNTI). In a license assisted access (LAA) secondary cell (Scell), the DCI received in a particular subframe may include a "Subframe configuration for LAA" field that the UE may use to assume the configuration of occupied OFDM symbols in the current subframe (in which the DCI is received) or in the next subframe (after the subframe in which the DCI is received).

The DCI 125A includes a "subframe configuration for LAA" field whose value is set to 0000. The value 0000, using the table 150 of FIG. 1B, maps to a configuration of occupied OFDM symbols of "(-,14)." The configuration (-,14) indicates that the UE may assume that all 14 OFDM symbols are occupied in the current and the next subframes. The DCI 125B includes a "subframe configuration for LAA" field whose value is set to 0011. The value 0011, using the table 150 of FIG. 1B, maps to a configuration of occupied OFDM symbols of "(-,10)." The configuration (-,10) indicates that the UE may assume that all 14 OFDM symbols are occupied in the current subframe and the first 10 OFDM symbols are occupied in the next subframe, and that other OFDM symbols in the next subframe are not occupied. The DCI 125C includes a "subframe configuration for LAA" field whose value is set to 1010. The value 1010, using the table 150 of FIG. 1B, maps to a configuration of occupied OFDM symbols of "(10,-)." The configuration (10,-) indicates that the UE may assume that the first 10 OFDM symbols are occupied in the current subframe, and that other OFDM symbols in the current subframe are not occupied.

FIG. 1B is a table mapping values of the "Subframe configuration for license assisted access (LAA)" field in the downlink control information (DCI) into configurations of occupied OFDM symbols.

The table 150 of FIG. 1B includes a left column and a right column. The left column includes sixteen values 160 of the "Subframe configuration for license assisted access (LAA)" field in the DCI. The three values used in the DCIs of the diagram 100 are included among these sixteen values 160. The right column includes sixteen configurations 170 of occupied OFDM symbols, each configuration corresponding to one of the values 160.

A note 180 explains the format of the configurations 170 of occupied OFDM symbols. Specifically, a configuration in the form of "(-, Y)" means that the UE may assume that the first Y OFDM symbols are occupied in next subframe, and that the other OFDM symbols in the next subframe, if any, are not occupied. A configuration in the form of "(X,-)" means that the UE may assume that the first X OFDM symbols are occupied in the current subframe, and that the other OFDM symbols in the current subframe are not occupied. A configuration in the form of "(X,*)" means the UE may assume that the first X OFDM symbols are occupied in the current subframe, and that at least the first OFDM symbol of the next subframe is not occupied.

Figure 2:
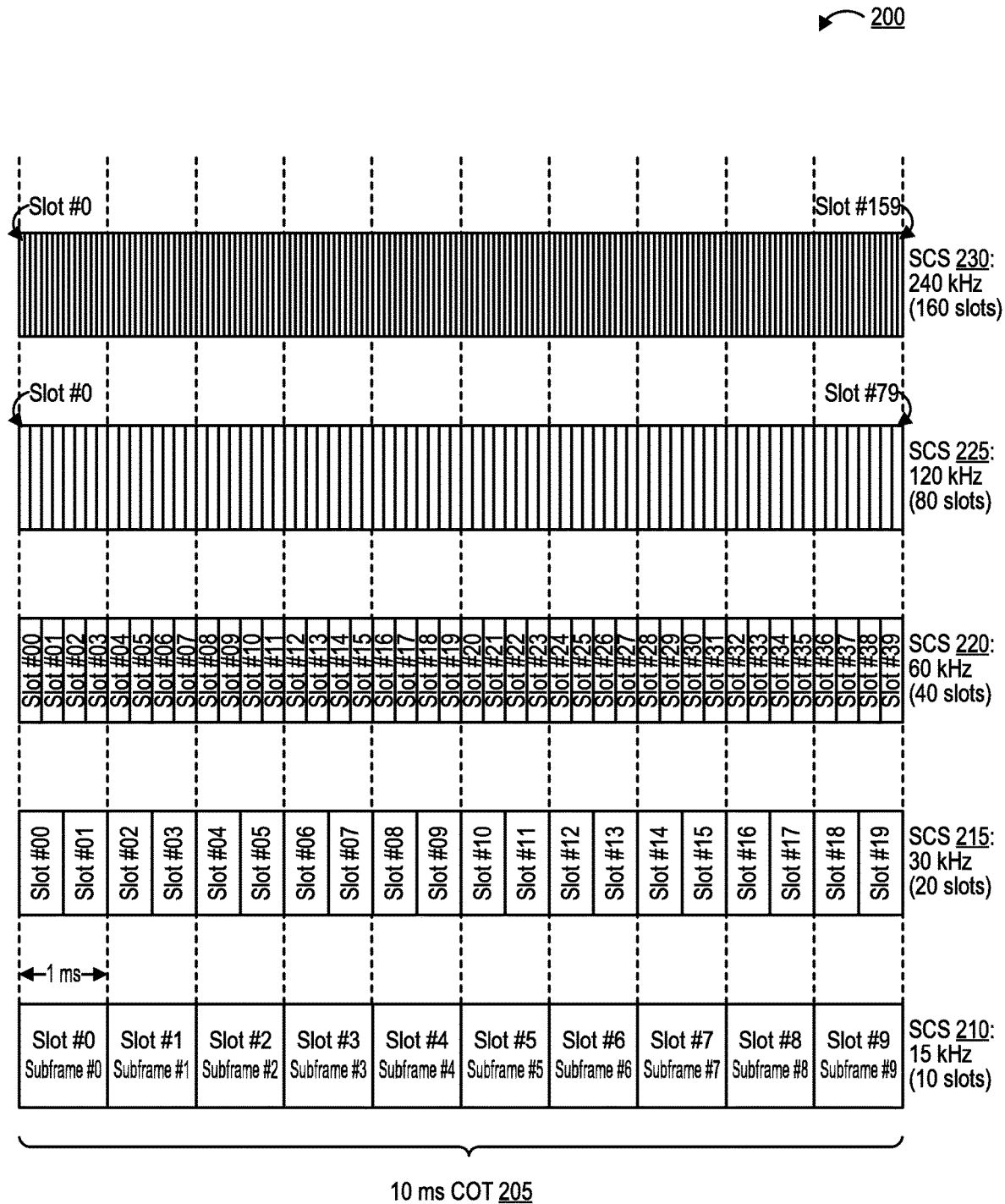
FIG. 2 illustrates a channel occupancy time (COT) divided into slots at different subcarrier spacing (SCS) frequencies.

FIG. 2 illustrates a channel occupancy time (COT) divided into slots at different subcarrier spacing (SCS) frequencies.

In particular, the diagram 200 of FIG. 2 illustrates a COT 205 that is 10 ms long, which may be the MCOT. A 10 ms COT includes ten subframes that each last 1 ms. How the 10 ms COT 205 divides into slots depends on the subcarrier spacing (SCS). In LTE, only 15 kilohertz (kHz) SCS is supported. In 5G NR and NR-U systems, supported frequencies for the SCS may include 15 kilohertz (kHz), 30 kHz, 60 kHz, 220 kHz, and 240 kHz. An SCS of 480 kHz may be supported in the future. Additional SCS frequencies may be supported in the future, such as 960 kHz, 1920 kHz, 3840 kHz, or another frequency value determined by the formula SCS=($2^\mu$) (15 kHz), where $\mu$ is a non-negative integer.

The diagram 200 illustrates slots for a first SCS 210 of 15 kHz, a second SCS 215 of 30 kHz, a third SCS 220 of 60 kHz, a fourth SCS 225 of 120 kHz, and a fifth SCS 230 of 240 kHz. For the first SCS 210 of 15 kHz, the 10 ms COT 205 includes 10 slots that each last 1 ms. Because the slots for the SCS 210 of 15 kHz are also the subframes of the 10 ms COT 205, the diagram 200 breaks the 10 ms COT 205 into 10 boxes under the 15 kHz SCS 210, the boxes each representing both a subframe and a slot and labeled with a subframe and slot number iterating from 0 to 9 as time passes from the left side to the right side of the diagram 200. The diagram 200 includes vertical dashed lines extending upward from the left and right sides of the subframe boxes for the 15 kHz SCS 210, the vertical dashed lines representing the subframe boundaries.

For the second SCS 215 of 30 kHz, the 10 ms COT 205 includes 20 slots that each last 0.5 ms. That is, each subframe includes two slots. Thus, the diagram 200 breaks the 10 ms COT 205 into 20 boxes under the 30 kHz SCS 215, the boxes each representing a slot and labeled with a slot number iterating from 0 to 19 as time passes from the left side to the right side of the diagram 200.

For the third SCS 220 of 60 kHz, the 10 ms COT 205 includes 40 slots that each last 0.25 ms. That is, each subframe includes 4 slots. Thus, the diagram 200 breaks the 10 ms COT 205 into 40 boxes under the 60 kHz SCS 220, the boxes each representing a slot and labeled with a slot number iterating from 0 to 39 as time passes from the left side to the right side of the diagram 200.

For the fourth SCS 225 of 120 kHz, the 10 ms COT 205 includes 80 slots that each last 0.125 ms. That is, each subframe includes 8 slots. Thus, the diagram 200 breaks the 10 ms COT 205 into 80 boxes under the 120 kHz SCS 225, the boxes each representing a slot. The boxes representing the slots for the 120 kHz SCS 225 are too small within the diagram 200 to clearly label each of the boxes with a slot number, but the boxes represent slot numbers iterating from 0 to 79 as time passes from the left side to the right side of the diagram 200. Slots 0 and 79 are labeled with arrows.

For the fifth SCS 230 of 240 kHz, the 10 ms COT 205 includes 160 slots that each last 0.0625 ms. That is, each subframe includes 16 slots. Thus, the diagram 200 breaks the 10 ms COT 205 into 160 boxes under the 240 kHz SCS 230, the boxes each representing a slot. The boxes representing the slots for the 240 kHz SCS 230 are too small within the diagram 200 to clearly label each of the boxes with a slot number, but the boxes represent slot numbers iterating from 0 to 159 as time passes from the left side to the right side of the diagram 200. Slots 0 and 159 are labeled with arrows.

Further SCS frequencies are not illustrated, but an SCS of 480 kHz would include 320 slots (32 slots per subframe). For any SCS defined by the formula SCS=($2^\mu$) (15 kHz), the number of slots in the 10 ms COT 205 is ($2^\mu$) (10), and the number of slots per subframe is $2^\mu$. Likewise, the number of slots in a COT with a different length c (in milliseconds) is defined as ($2^\mu$) (c).

Figure 3:
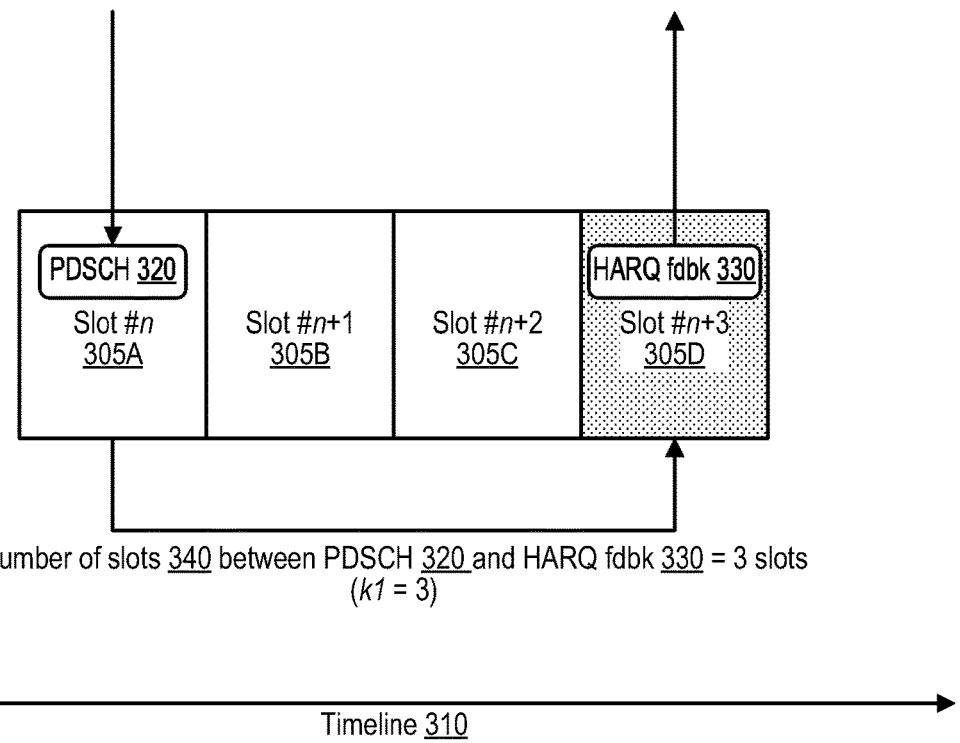
FIG. 3 illustrates a hybrid automatic repeat request (HARQ) feedback process.

FIG. 3 illustrates a hybrid automatic repeat request (HARQ) feedback process.

In particular, the diagram 300 of FIG. 3 illustrates a timeline 310, with time moving from left to right. Along the timeline 310, four slots 305A-D are illustrated. The four slots 305A-D include three downlink (DL) slots, which are illustrated with a white background as indicated in the legend 390, followed by one uplink (UL) slot, which is illustrated with a shaded background as indicated in the legend 390. More specifically, the four slots 305A-D include a DL slot 305A with a slot number of n, a DL slot 305B with a slot number of n+1, a DL slot 305C with a slot number of n+2, and an UL slot 305D with a slot number of n+3.

During the DL slot 305A with the slot number n, a UE receives DL data 320 over the physical downlink shared channel (PDSCH). The DL data 320 that is received over PDSCH may be referred to as a PDSCH 320. During the UL slot 305D with the slot number n+3, the UE transmits a hybrid automatic repeat request (HARQ) feedback information 330 corresponding to the PDSCH 320. The HARQ feedback information 330 may be an acknowledgment (ACK), indicating proper receipt and decoding/processing of the PDSCH 320, or a negative acknowledgment (NACK), indicating a failure to receive and/or properly decode/process the PDSCH 320. The number of slots 340 between the DL slot 305A with the slot number n at which the PDSCH 320 is received and the UL slot 305D with the slot number n+3 at which the HARQ feedback information 330 is sent is 3 slots. This number of slots 340 may be referred to by the variable k1. Thus, in the diagram 300 of FIG. 3, k1=3. In other examples, the number of slots 340—that is, the variable k1—may be smaller than 3 (e.g., 0, 1, 3) or larger than 3 (e.g., 4, 5, 6, etc.).

FIG. 4 is a table mapping values in a PDSCH-to-HARQ_feedback timing indicator field to numbers of slots in a dl-DataToUL-ACK list.

A DCI may be a downlink scheduling DCI or an uplink scheduling DCI. Downlink scheduling DCIs include DCIs with DCI format 1_0 and DCIs with DCI format 1_1. Uplink scheduling DCIs include DCIs with DCI format 0_0 and DCIs with DCI format 0_1. Downlink scheduling DCIs may be used to schedule transmission of a PDSCH from the gNB to the UE and/or receipt of the PDSCH at the UE from the gNB. A DCI that schedules receipt of a PDSCH is typically received during the slot before or not later than the PDSCH is received by the UE. For example, in the context of such as the PDSCH 320 that is received in slot #n in diagram 300, the corresponding DCI that schedules receipt of the PDSCH 320 would be received by the UE in slot #n−1 (not pictured), just before slot #n.

As discussed with respect to the diagram 300 of FIG. 3, the number of slots between the DL slot at which a PDSCH is received and the UL slot at which the HARQ feedback information 330 is sent is referred to as the variable k1. The variable k1 is based on a value indicated in a PDSCH-to-HARQ_feedback timing indicator field (also referred to as a downlink control indicator) within a downlink scheduling DCI received by the UE, the downlink scheduling DCI having either format 1_0 or format 1_1. The bitwidth of the PDSCH-to-HARQ_feedback timing indicator field—that is, how many bits are included—may vary, and may dictate how many different values the variable k1 can be selected from.

For example, in DCI format 1_0, the bitwidth of the PDSCH-to-HARQ_feedback timing indicator field is 3 bits. As such, the PDSCH-to-HARQ_feedback timing indicator field may have any one of eight values, with each of the eight possible values listed in the table 400 under the "3 bits" sub-column 460 of the PDSCH-to-HARQ_feedback timing indicator column 410. Each of these eight 3-bit values, under DCI format 1_0, map, in order, to a value for the variable k1 selected from the list of possible slot timing values {1, 2, 3, 4, 5, 6, 7, 8} which is listed in the table 400 under column 430. That is, if the value in the PDSCH-to-HARQ_feedback timing indicator field is "000," then k1=1 for DCI format 1_0; if the value in the PDSCH-to-HARQ_feedback timing indicator field is "001," then k1=2 for DCI format 1_0; if the value in the PDSCH-to-HARQ_feedback timing indicator field is "010," then k1=3 for DCI format 1_0; if the value in the PDSCH-to-HARQ_feedback timing indicator field is "011," then k1=4 for DCI format 1_0; and so forth.

In DCI format 1_1, the bitwidth of the PDSCH-to-HARQ_feedback timing indicator may be 0, 1, 2, or 3 bits, depending on the number of entries in the higher layer parameter dl-DataToUL-ACK, which in 5G NR/NR-U is included in the physical uplink control channel (PUCCH) configuration PUCCH-Config provided through radio resource control (RCC). The parameter dl-DataToUL-ACK includes a list or array of values, which generally includes either a single nonnegative integer value, 2 nonnegative integer values, 4 nonnegative integer values, or 8 nonnegative integer values. In some cases, dl-DataToUL-ACK may include a quantity of values in between these quantities, particularly 3, 5, 6, or 7. If the parameter dl-DataToUL-ACK includes only a single value, then the bitwidth of the PDSCH-to-HARQ_feedback timing indicator is 0 bits; in other words, the PDSCH-to-HARQ_feedback timing indicator may be omitted from the DCI entirely. If the parameter dl-DataToUL-ACK includes two values, then the bitwidth of the PDSCH-to-HARQ_feedback timing indicator is 1 bit; in other words, the PDSCH-to-HARQ_feedback timing indicator is a Boolean field. If the parameter dl-DataToUL-ACK includes four values, then the bitwidth of the PDSCH-to-HARQ_feedback timing indicator is 2 bits. If the parameter dl-DataToUL-ACK includes three or four values, then the bitwidth of the PDSCH-to-HARQ_feedback timing indicator is 2 bits. If the parameter dl-DataToUL-ACK includes 5, 6, 7, or 8 values, then the bitwidth of the PDSCH-to-HARQ_feedback timing indicator is 3 bits. In other words, the bitwidth of the PDSCH-to-HARQ_feedback timing indicator is equal to $[\log_2(I)]$, where I is the number of entries in the parameter dl-DataToUL-ACK.

In DCI format 1_1, if the bitwidth of the PDSCH-to-HARQ_feedback timing indicator is 0 bits, the value of k1 is the lone integer value included in dl-DataToUL-ACK (not pictured in the table 400). If the bitwidth of the PDSCH-to-HARQ_feedback timing indicator is 1 bit, then the possible values of the PDSCH-to-HARQ_feedback timing indicator (0 and 1) are listed in the table 400 under the "1 bit" sub-column 440 of the PDSCH-to-HARQ_feedback timing indicator column 410, with the corresponding value of the variable k1 for each value of the PDSCH-to-HARQ_feedback timing indicator given by the corresponding row in the "number of slots k1 for DCI format 1_1" column 420. If the bitwidth of the PDSCH-to-HARQ_feedback timing indicator is 2 bits, then the possible values of the PDSCH-to-HARQ_feedback timing indicator (00, 01, 10, 11) are listed in the table 400 under the "2 bit" sub-column 450 of the PDSCH-to-HARQ_feedback timing indicator column 410, with the corresponding value of the variable k1 for each value of the PDSCH-to-HARQ_feedback timing indicator given by the corresponding row in the "number of slots k1 for DCI format 1_1" column 420. If the bitwidth of the PDSCH-to-HARQ_feedback timing indicator is 3 bits, then the possible values of the PDSCH-to-HARQ_feedback timing indicator (000, 001, 010, 011, 100, 101, 110, 111) are listed in the table 400 under the "3 bit" sub-column 460 of the PDSCH-to-HARQ_feedback timing indicator column 410, with the corresponding value of the variable k1 for each value of the PDSCH-to-HARQ_feedback timing indicator given by the corresponding row in the "number of slots k1 for DCI format 1_1" column 420.

In other words, in DCI format 1_1, if the value in the PDSCH-to-HARQ_feedback timing indicator field is "0" or "00" or "000," then k1 is the first value in dl-DataToUL-ACK; if the value in the PDSCH-to-HARQ_feedback timing indicator field is "1" or "01" or "001," then k1 is the second value in dl-DataToUL-ACK; if the value in the PDSCH-to-HARQ_feedback timing indicator field is "10" or "010," then k1 is the third value in dl-DataToUL-ACK; if the value in the PDSCH-to-HARQ_feedback timing indicator field is "11" or "011," then k1 is the fourth value in dl-DataToUL-ACK; if the value in the PDSCH-to-HARQ_feedback timing indicator field is "100," then k1 is the fifth value in dl-DataToUL-ACK; and so forth.

Some systems may include, within dl-DataToUL-ACK, a list of eight integers with the lowest integer in the list being zero and the highest integer in the list being 15. In such systems, the highest possible value of k1 when DCI format 1_1 is used is 15, while the highest possible value of k1 when DCI format 1_0 is used is 8.

Figure 5:
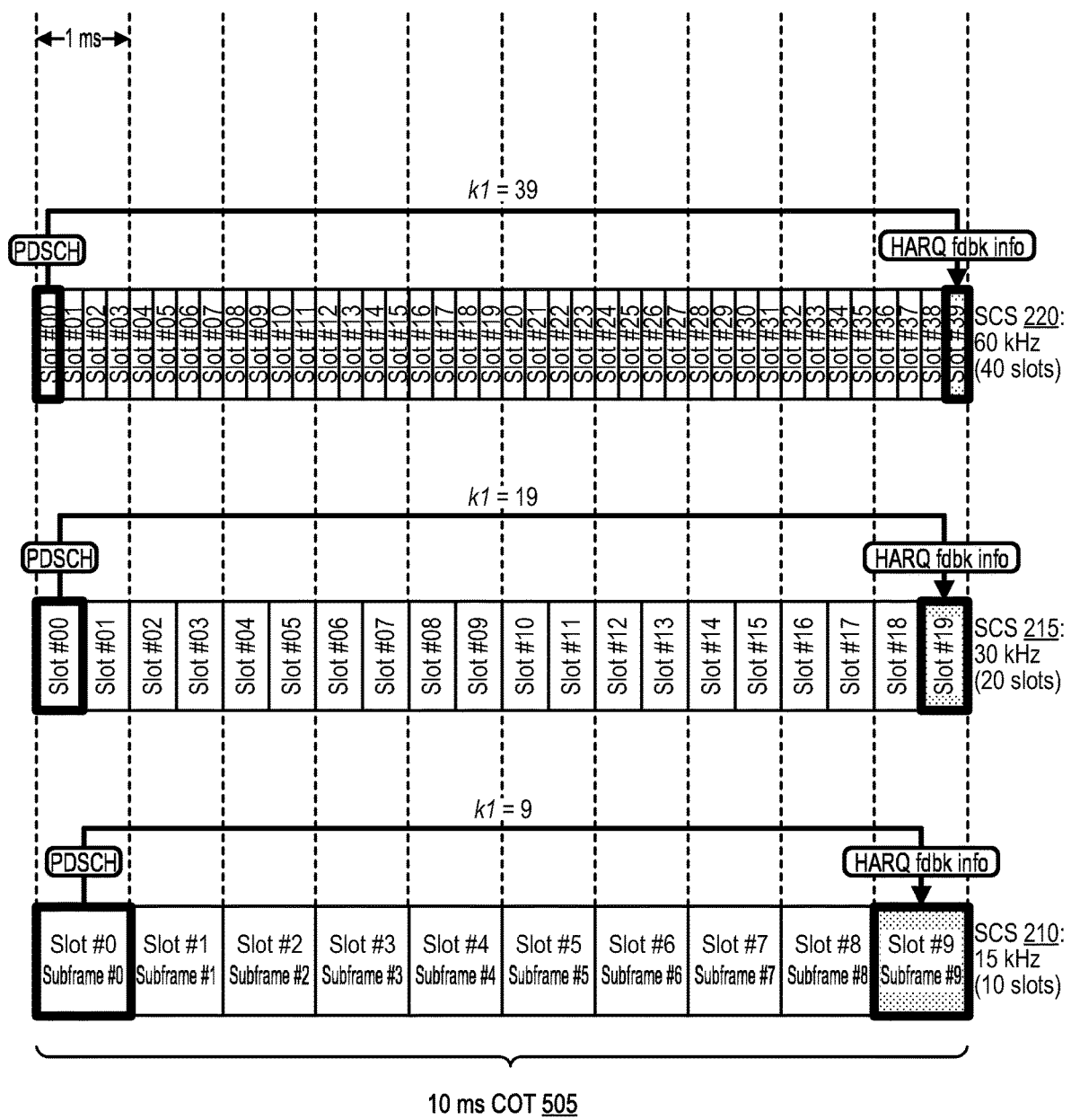
FIG. 5 illustrates a 10 ms channel occupancy time (COT) in which PDSCH is received during a first slot of the COT and the corresponding HARQ feedback information is sent during a last slot of the COT.

FIG. 5 illustrates a 10 ms channel occupancy time (COT) in which PDSCH is received during a first slot of the COT and the corresponding HARQ feedback information is sent during a last slot of the COT.

Like the diagram 200 of FIG. 2, the diagram 500 of FIG. 5 illustrates a 10 ms COT 505 divided into 10 slots at a 15 kHz SCS 210, divided into 20 slots at a 30 kHz SCS 215, and divided into 40 slots at a 60 kHz SCS 220. The 10 ms COT 505 may, in some systems, be a maximum-length COT.

In order to achieve HARQ feedback that is self-contained within the same COT as the corresponding PDSCH, the variable k1 should be able to support timings from any slot of a COT to any later slot in the COT, using any SCS, and even at a maximum COT size. For example, the variable k1 should be able to support timings from the first slot of the COT 505 to any other slot of the COT 505, up to and including the very last slot of the COT 505, using any SCS.

With a 15 kHz SCS 210, the 10 ms COT 505 has 10 slots, so the variable k1=9 when the PDSCH is received in the first slot of the COT 505 and the HARQ feedback information is transmitted in the last slot of the COT 505. With a 30 kHz SCS 210, the 10 ms COT 505 has 20 slots, so the variable k1=19 when the PDSCH is received in the first slot of the COT 505 and the HARQ feedback information is transmitted in the last slot of the COT 505. With a 60 kHz SCS 210, the 10 ms COT 505 has 40 slots, so the variable k1=39 when the PDSCH is received in the first slot of the COT 505 and the HARQ feedback information is transmitted in the last slot of the COT 505.

While the 80 slots of the 120 kHz SCS 225 and the 160 slots of the 240 kHz SCS 230 of the diagram 200 are not included in the diagram 500 to maintain clarity in the diagram 500, the variable k1 should support these SCS values as well. With a 120 kHz SCS 210, the 10 ms COT 505 has 80 slots, so the variable k1=79 when the PDSCH is received in the first slot of the COT 505 and the HARQ feedback information is transmitted in the last slot of the COT 505. With a 240 kHz SCS 210, the 10 ms COT 505 has 160 slots, so the variable k1=159 when the PDSCH is received in the first slot of the COT 505 and the HARQ feedback information is transmitted in the last slot of the COT 505. Going further still, with a 480 kHz SCS, the 10 ms COT 505 has 320 slots, so the variable k1=319 when the PDSCH is received in the first slot of the COT 505 and the HARQ feedback information is transmitted in the last slot of the COT 505. With a 960 kHz SCS, the 10 ms COT 505 has 640 slots, so the variable k1=639 when the PDSCH is received in the first slot of the COT 505 and the HARQ feedback information is transmitted in the last slot of the COT 505. In other words, where the SCS=$(2^\mu) \cdot (15$ kHz$)$, the number of slots in the 10 ms COT 505 is $(2^\mu) \cdot (10)$, so the variable k1=$(2^\mu) \cdot (10)-1$ when the PDSCH is received in the first slot of the COT 505 and the HARQ feedback information is transmitted in the last slot of the COT 505.

As the table 400 shows, a 3-bit PDSCH-to-HARQ_feedback timing indicator field can only support up to 8 different values for k1. Thus, especially for SCS frequencies of 30 kHz or higher, k1 may be inapplicable to flexibly support providing timing differences for the entire range of values up to the entire length of a length of a 10 ms COT 505 when based on a PDSCH-to-HARQ_feedback timing indicator field that with a bitwidth of 3 or less. Such an inapplicability to represent certain timing values can result in failure by the UE to properly transmit HARQ feedback information, inefficiency due to unnecessary retransmission of downlink data to the UE, inefficient scheduling, and potential loss of access to the medium.

One solution to the issue of k1 being inapplicable to support flexibly providing timing differences up to the end of a system's maximum COT length is to increase in the bitwidth of the PDSCH-to-HARQ_feedback timing indicator field in the DCI. More specifically, bitwidth may be increased enough to allow k1 to support providing timing differences for any value up to the entire length of a system's maximum COT as in the examples shown in the diagram 500. In the example of the diagram 500, the system's maximum COT is the 10 ms COT 505 of the diagram 500. For k1 to support the full range of possible values $\{0, \ldots, 9\}$ for a 15 kHz SCS 210, a 4-bit PDSCH-to-HARQ_feedback timing indicator field is necessary. If zero is omitted, a 3-bit PDSCH-to-HARQ feedback timing indicator field is necessary.

For k1 to support the full range of possible values $\{0, \ldots, 19\}$ for a 30 kHz SCS 215, a 5-bit PDSCH-to-HARQ_feedback timing indicator field is necessary. For k1 to support the full range of possible values $\{0, \ldots, 39\}$ for a 60 kHz SCS 220, a 6-bit PDSCH-to-HARQ_feedback timing indicator field is necessary. For k1 to support the full range of possible values $\{0, \ldots, 79\}$ for a 120 kHz SCS 225, a 7-bit PDSCH-to-HARQ_feedback timing indicator field is necessary. For k1 to support the full range of possible values $\{0, \ldots, 159\}$ for a 240 kHz SCS 225, an 8-bit PDSCH-to-HARQ_feedback timing indicator field is necessary. For k1 to support the full range of possible values $\{0, \ldots, (2^\mu) \cdot (10)-1\}$ for a SCS of $(2^\mu) \cdot (15$ kHz$)$, a PDSCH-to-HARQ_feedback timing indicator field with a bitwidth of $[\log_2((2^\mu) \cdot (15$ kHz$))]$ is necessary. Because DCIs are sent regularly (e.g., once every slot or every subframe), increasing the size of the DCI by increasing the bitwidth of the PDSCH-to-HARQ_feedback timing indicator field within the DCI increases bandwidth usage for control data, and may be inefficient.

Figure 6:
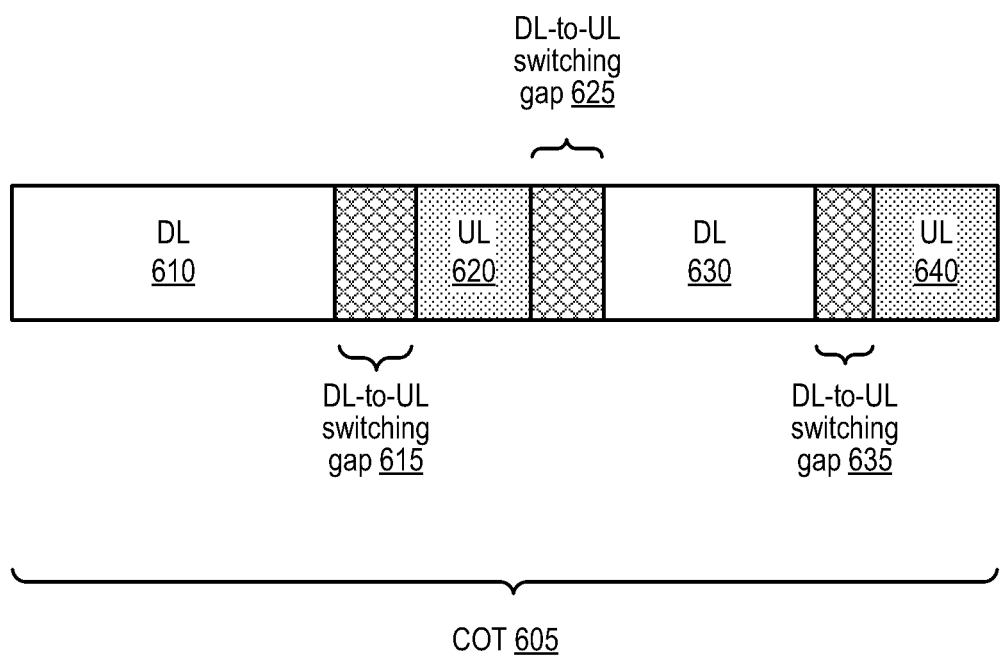
FIG. 6 illustrates a channel occupancy time (COT) with multiple DL-to-UL switching points.

FIG. 6 illustrates a channel occupancy time (COT) with multiple DL-to-UL switching points.

A second solution to the issue of k1 being inapplicable to support flexibly providing timing differences up to the end of a system's maximum COT length is to increase the quantity of DL-to-UL switching points within the COT. Since HARQ feedback information corresponding to a PDSCH may be sent in the next available block of UL time after receipt of the PDSCH, more frequent switching between DL and UL within the COT means that the variable k1 will only need to be able to span a fraction of the COT rather than the entire length of the COT. However, increasing the DL-to-UL switching points may not be appropriate for all cases, since gNB needs to reserve time gaps for switching from DL to UL, and for switching from UL to DL, which may be inefficient and may cause potential loss of access to the medium.

For example, the diagram 600 of FIG. 6 illustrates a DL-heavy COT 605 of an unspecified length, with time passing from the left side of the diagram 600 to the right side. The COT 605 includes a block of downlink time 610 (also referred to as a downlink block 610 or DL block 610), followed by a gap 615 reserved by the gNB for switching between DL and UL. The gap 615 is followed by a block of uplink time 620 (also referred to as an uplink block or UL block 620), which in turn is followed by another gap 625 for switching between UL and DL. The gap 625 is followed by another block of DL time 630 (also referred to as a downlink block 630 or DL block 630), which is followed by another gap 635 for switching between DL and UL. A HARQ feedback information for a PDSCH received in the DL block 610 may be sent in the UL block 620. A HARQ feedback information for a PDSCH received in the DL block 630 may be sent in the UL block 640. However, a considerable portion of the COT 605 is effectively wasted on gaps 615, 625, and 635.

Figure 7:
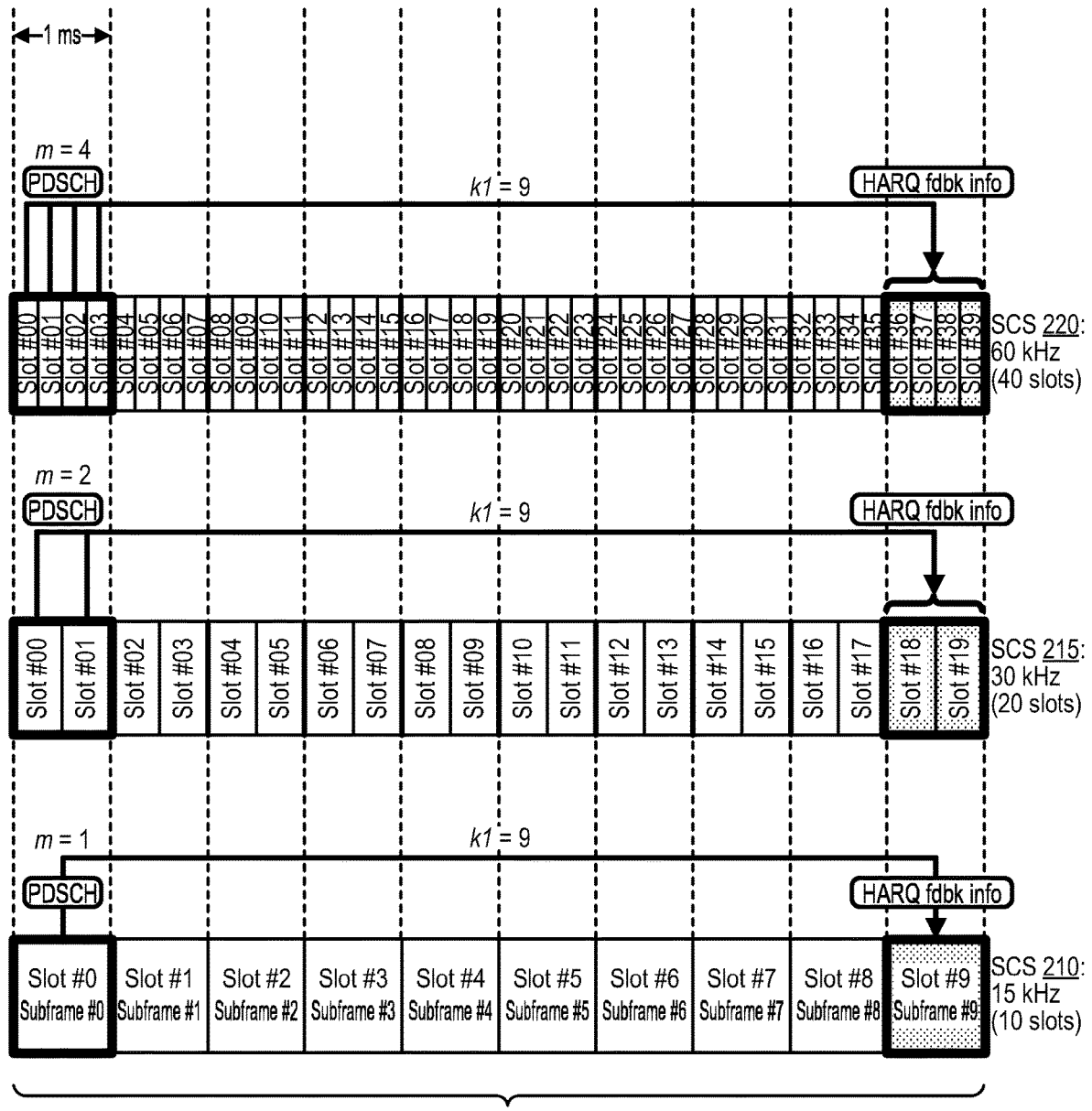
FIG. 7 illustrates a 10 ms channel occupancy time (COT) in which PDSCH is received during a first group of slots in the COT and HARQ feedback information is sent during a last group of slots in the COT.

FIG. 7 illustrates a 10 ms channel occupancy time (COT) in which PDSCH is received during a first group of slots in the COT and HARQ feedback information is sent during a last group of slots in the COT.

A third solution to the issue of k1 being inapplicable to support flexibly providing timing differences up to the end of a system's maximum COT length is have the variable k1 represent a number of groups of slots (rather than individual slots) between a DL group of slots (rather than individual slot) during which a PDSCH is received an UL group of slots (rather than individual slot) during which the corresponding HARQ feedback information is transmitted. Each group of slots includes a number of slots represented by a positive integer m. The variable m may be greater than or equal to one.

The diagram 700 illustrates this slot grouping concept in the context of a 10 ms COT 705, a 15 kHz SCS 210, a 30 kHz SCS 215, and a 60 kHz SCS 220. For the 15 kHz SCS 210, m=1, meaning that each slot group includes only a single slot. Essentially, then, the 15 kHz SCS 210 doesn't behave any differently in the diagram 700 than in the diagram 500. For the 15 kHz SCS 210, then, k1 is still equal to 9 when the PDSCH is received in the first slot of the COT 705 and the HARQ feedback information is transmitted in the last slot of the COT 705.

For the 30 kHz SCS 215, however, m=2, meaning that each slot group includes two slots. The boundaries of each slot group for the 30 kHz SCS 215 and the 60 kHz SCS 220 are illustrated with slightly thicker lines to be more clearly visible. For the 30 kHz SCS 215, slot groups include the pair of DL slots #00 and #01, the pair of DL slots #02 and #03, the pair of DL slots #06 and #07, and so forth, up to the pair of UL slots #18 and #19. For the 30 kHz SCS 215, k1=9 when the PDSCH is received in the first group of slots of the COT 705 (the pair of DL slots #00 and #01) and the HARQ feedback information is transmitted in the last group of slots of the COT 705 (the pair of UL slots #18 and #19), since these two groups of slots are 9 slot groups (pairs of slots) away from one another.

For the 60 kHz SCS 220, m=4, meaning that each slot group includes four slots. For the 60 kHz SCS 220, slot groups include the group of DL slots #00 through #03, the group of DL slots #04 through #07, the group of DL slots #08 through #11, and so forth, up to the group of UL slots #36 through #39. For the 60 kHz SCS 220, k1=9 when the PDSCH is received in the first group of slots of the COT 705 (the group of DL slots #00 through #03) and the HARQ feedback information is transmitted in the last group of slots of the COT 705 (group of UL slots #36 through #39), since these two groups of slots are 9 slot groups (of 4 slots each) away from one another.

Because k1 actually represents a number of groups of slots with m slots each, a time duration (in slots) that k1 represents can be determined as k1·m. The parameter m may be determined based on SCS as seen in the diagram 700. The parameter m may also be determined based on (or otherwise related to) bitwidth of the PDSCH-to-HARQ_feedback timing indicator DCI field, COT length, maximum DL duration length, number of DL-to-UL switches, number of UL-to-DL switches, numerology, or some combination thereof.

If a PDSCH is received in slot n, the slot group that the slot n belongs to can be determined by calculating a reference DL slot number n', where $$n' = \left\lfloor \frac{n}{m} \right\rfloor \cdot m.$$

Using this calculation, the reference DL slot number n' refers to the first (earliest) slot in the group of slots to which the slot n belongs. A set of UL slots at which the HARQ feedback information corresponding to slot n is transmitted is equal to n'+k1·m+k2, where k2∈{0, . . . , m−1}.

For example, for the 60 kHz SCS 220, if a PDSCH is received in slot #02, the reference DL slot number $$n' = \left\lfloor \frac{2}{4} \right\rfloor \cdot 4 = 0,$$

referring to slot #00, which is the first (earliest) slot that is in the same slot group as slot #02 as illustrated in the diagram 700. The set of UL slots at which the HARQ feedback information corresponding to slot #02 is transmitted is equal to 0+9·4+k2, where k2∈{0, . . . , 4−1}. Solving this for each value of k2 in this example returns the set {36, 37, 38, 39}, which are the slot numbers of the slots in the UL slot group illustrated in the diagram 700. The DCI scheduling the PDSCH may have been received in slot #01.

Which specific slot within the UL slot group is actually used to transmit the HARQ feedback information may be determined by a predefined and/or preconfigured rule, or may be indicated by signaling (e.g., from the gNB to the UE, from the UE to the gNB, or some combination thereof). The HARQ feedback information may be transmitted in a slot determined based on a function of a variety of values, such as the slot n at which the PDSCH corresponding to the HARQ feedback information was received, the reference DL slot number n', the slot group size m, the variable k1, another slot number within the same COT, a length of the COT, a slot number of the latest PDSCH received by the UE, a UE identifier (e.g., C-RNTI), a predefined constant, a integer randomly selected within a range, or some combination thereof. For example, if a PDSCH is received in slot n, the corresponding HARQ feedback information may be transmitted in slot n+k1·m. In some cases, the HARQ feedback information may be transmitted at the first (earliest) slot in the UL slot group (i.e., slot number n'+k1·m), the middle slot in the UL slot group (slot number $$n' + k1 \cdot m + \left\lfloor \frac{m}{2} \right\rfloor$$

or slot number $$n' + k1 \cdot m + \left\lceil \frac{m}{2} \right\rceil),$$

or the last slot in the UL slot group (slot number n'+k1·m+ m·1). In some cases, the HARQ feedback information may be transmitted in slot number n'+k1·m+k2, where variable k2 is an integer between zero and m−1. The variable k2 may be a predefined constant, or may be modified over time, for example by being a randomly selected integer between zero and m−1.

Figure 8:
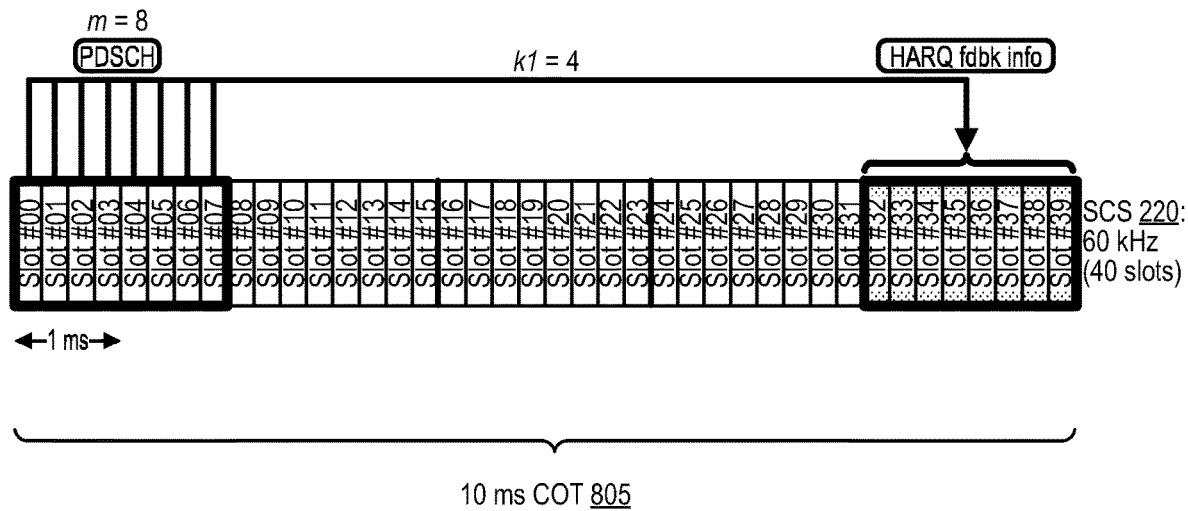
FIG. 8 illustrates a 10 ms channel occupancy time (COT) with a 60 kHz SCS in which PDSCH is received during a first group of slots in the COT and HARQ feedback information is sent during a last group of slots in the COT, where the PDSCH-to-HARQ_feedback timing indicator bitwidth is decreased to 2 and m is increased to 8.

FIG. 8 illustrates a 10 ms channel occupancy time (COT) with a 60 kHz SCS in which PDSCH is received during a first group of slots in the COT and HARQ feedback information is sent during a last group of slots in the COT, where the PDSCH-to-HARQ_feedback timing indicator bitwidth is decreased to 2 and m is increased to 8.

As discussed with respect to FIG. 7, the parameter m may be related to SCS and bitwidth of the PDSCH-to-HARQ_feedback timing indicator DCI field, potentially among other values. The diagram 800 of FIG. 8 illustrates a 10 ms COT 805, where the SCS is a 60 kHz SCS 220, the bitwidth of the PDSCH-to-HARQ_feedback timing indicator DCI field is 2 bits, and m=8. Increasing m to 8 can allow the bitwidth of the PDSCH-to-HARQ_feedback timing indicator DCI field to decrease to 2, since a 2-bit PDSCH-to-HARQ_feedback timing indicator DCI field can set k1 to one of four values, and selecting k1 from the set {1, 2, 3, 4} allows full coverage of the COT 805. Likewise, decreasing the bitwidth of the PDSCH-to-HARQ_feedback timing indicator DCI field to 2 provides reason to increase m to 8, as otherwise k1 cannot flexibly cover the range of the COT 805.

For a PDSCH received in slot n within the illustrated DL slot group (slots #00 through #07), k1=4, and the reference DL slot number $$n' = \left\lfloor \frac{n \in \{0, 1, 2, 3, 4, 5, 6, 7\}}{8} \right\rfloor \cdot 8 = 0.$$

The UL slot group at which to transmit the corresponding HARQ feedback information includes slot numbers #32 through #39, which can be calculated as such: n'+k1·m+k2=+4·8+k2, where k2∈{0, 1, 2, 3, 4, 5, 6, 7}.

The table 810 includes a column for SCS 815, a column for bitwidth 820 of the PDSCH-to-HARQ_feedback timing indicator DCI field, and a column for the value of the parameter m 825. The table 810 aligns the 60 kHz SCS 220, 2-bit bitwidth, and m=8 in the same row, as well as other exemplary combinations.

Figure 9:
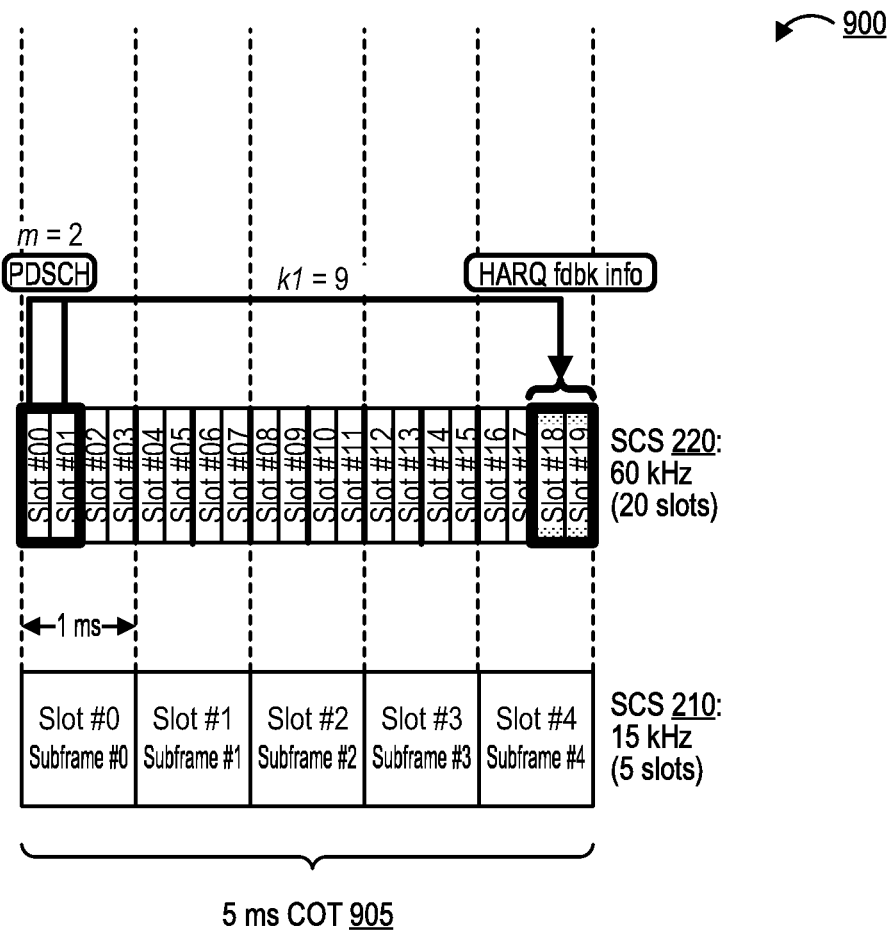
FIG. 9 illustrates a 5 ms channel occupancy time (COT) with a 60 kHz SCS in which PDSCH is received during a first group of slots in the COT and HARQ feedback information is sent during a last group of slots in the COT.

FIG. 9 illustrates a 5 ms channel occupancy time (COT) with a 60 kHz SCS in which PDSCH is received during a first group of slots in the COT and HARQ feedback information is sent during a last group of slots in the COT.

As discussed with respect to FIG. 7, the parameter m may be related to SCS and COT length, among other values. The diagram 900 of FIG. 8 illustrates a 5 ms COT 905. Time blocks for five slots with a 15 kHz SCS 210 in the COT 905 are illustrated for context. The diagram 900 also illustrates time blocks for a 60 kHz SCS 220 where m=2. Shrinking the size of the COT 905 to 5 ms while retaining the 3-bit PDSCH-to-HARQ_feedback timing indicator DCI field allows m to drop from 4 (as in the diagram 700) to 2 here.

For a PDSCH received in slot n within the illustrated DL slot group (slots #00 and #01), k1=9, and the reference DL slot number $$n' = \left\lfloor \frac{n \in \{0, 1\}}{2} \right\rfloor \cdot 2 = 0.$$

The UL slot group at which to transmit the corresponding HARQ feedback information includes slot numbers #18 and #19, which can be calculated as such: n'+k1·m+k2=+9·2+k2, where k2∈{0, 1}.

The table 910 includes a column for SCS 915, a column for COT length 920, and a column for the value of the parameter m 925. The table 910 aligns the 60 kHz SCS 220, 5 ms COT length, and m=2 in the same row, as well as other exemplary combinations.

Figure 10A:
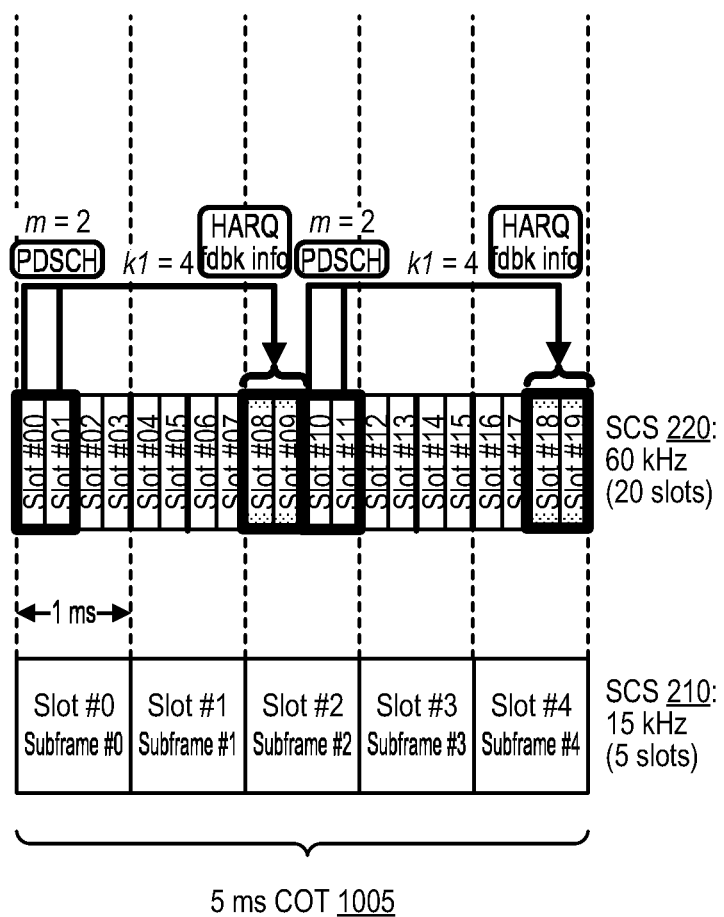
FIG. 10A illustrates a 5 ms channel occupancy time (COT) with a 60 kHz SCS with two DL-to-UL switches.

FIG. 10A illustrates a 5 ms channel occupancy time (COT) with a 60 kHz SCS with two DL-to-UL switches.

As discussed with respect to FIG. 7, the parameter m may be related to maximum DL duration length, number of DL-to-UL switches, and number of UL-to-DL switches, among other values. The diagram 1000 of FIG. 10A illustrates a 5 ms COT 1005. Time blocks for five slots with a 15 kHz SCS 210 in the COT 1005 are illustrated for context. The diagram 1000 also illustrates time blocks for a 60 kHz SCS 220 where m=2, where two DL-to-UL switches (and thus two groups of UL slots) are present within the COT 1005. In this example, m is not affected (compared to the diagram 900) by the addition of a second DL-to-UL switch. However, the bitwidth of the PDSCH-to-HARQ_feedback timing indicator DCI field could be reduced from 3 to 2, since k1 for both PDSCH-to-HARQ pairs is 4.

For a PDSCH received in slot #01 within the first illustrated DL slot group (slots #00 and #01), k1=4, and the reference DL slot number $$n' = \left\lfloor \frac{1}{2} \right\rfloor \cdot 2 = 0.$$

The UL slot group at which to transmit the corresponding HARQ feedback information includes slot numbers #08 and #09, which can be calculated as such: n'+k1·m+k2=0+4·2+k2, where k2∈{0, 1}.

For a PDSCH received in slot #11 within the second illustrated DL slot group (slots #10 and #11), k1=4, and the reference DL slot number $$n' = \left\lfloor \frac{11}{2} \right\rfloor \cdot 2 = 10.$$

The UL slot group at which to transmit the corresponding HARQ feedback information includes slot numbers #18 and #19, which can be calculated as such: n'+k1·m+k2=10+4·2+k2, where k2∈{0, 1}.

Figure 10B:
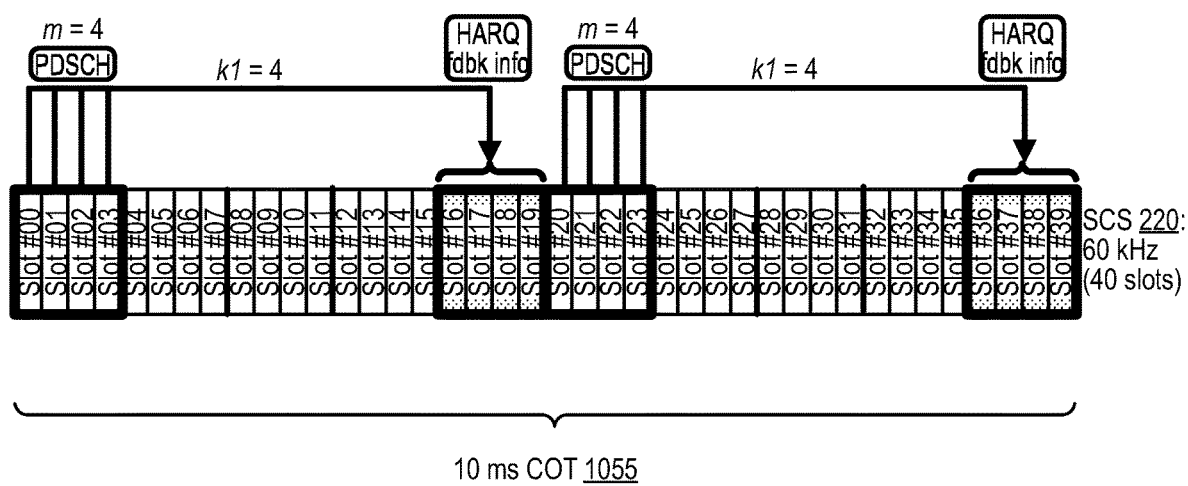
FIG. 10B illustrates a 10 ms channel occupancy time (COT) with a 60 kHz SCS with two DL-to-UL switches.

FIG. 10B illustrates a 10 ms channel occupancy time (COT) with a 60 kHz SCS with two DL-to-UL switches.

The diagram 1050 of FIG. 10B illustrates a 10 ms COT 1055, with time blocks for a 60 kHz SCS 220 where m=4, where two DL-to-UL switches (and thus two groups of UL slots) are present within the COT 1055. Here, m is not affected (compared to the diagram 700) by the addition of a second DL-to-UL switch. However, the bitwidth of the PDSCH-to-HARQ_feedback timing indicator DCI field could be reduced from 3 to 2, since k1 for both PDSCH-to-HARQ pairs is 4.

For a PDSCH received in slot #03 within the first illustrated DL slot group (slots #00 through #03), k1=4, and the reference DL slot number $$n' = \left\lfloor \frac{3}{4} \right\rfloor \cdot 4 = 0.$$

The UL slot group at which to transmit the corresponding HARQ feedback information includes slot numbers #16 through #19, which can be calculated as such: n'+k1·m+k2=0+4·4+k2, where k2∈{0, 1, 2, 3}.

For a PDSCH received in slot #22 within the second illustrated DL slot group (slots #20 through #23), k1=4, and the reference DL slot number $$n' = \left\lfloor \frac{22}{4} \right\rfloor \cdot 4 = 20.$$

The UL slot group at which to transmit the corresponding HARQ feedback information includes slot numbers #36 through #39, which can be calculated as such: n'+k1·m+k2=20+4·4+k2, where k2∈{0, 1, 2, 3}.

Figure 11A:
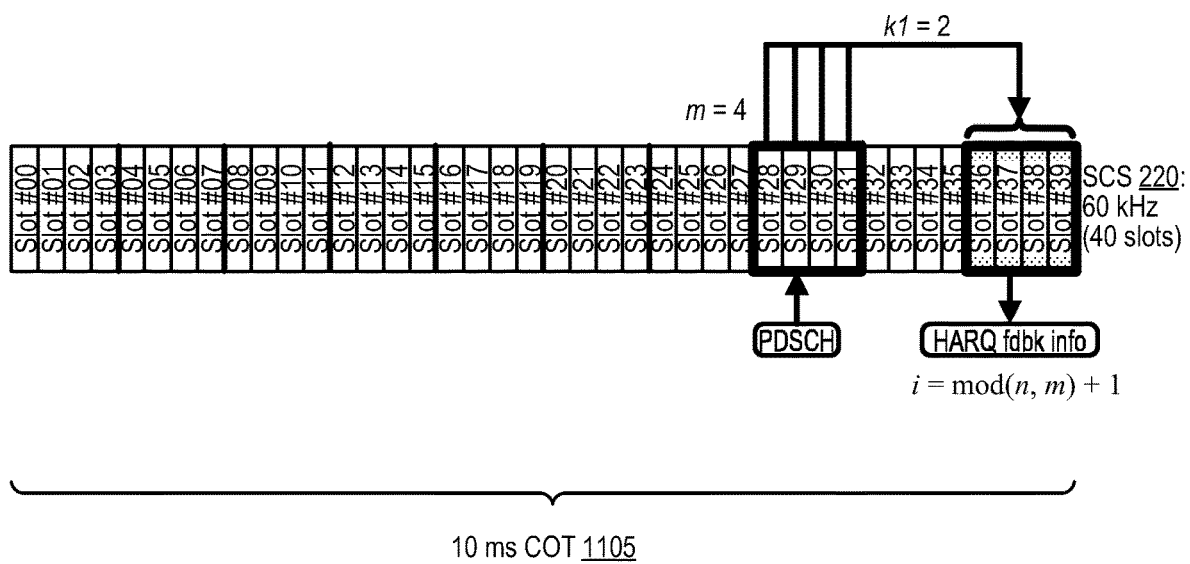
FIG. 11A illustrates use of a rule to determine a specific slot for HARQ feedback within a group of slots.

FIG. 11A is a diagram 1100 illustrating use of a rule to determine a specific slot for HARQ feedback within a group of slots.

The diagram 1100 of FIG. 11A illustrates a 10 ms COT 1105, with time blocks for a 60 kHz SCS 220 where m=4. A PDSCH is received in slot #29, which is part of a group of 4 DL slots ranging from slot #28 to slot #31. HARQ feedback information corresponding to the PDSCH is transmitted in slot #37, which is part of a group of 4 UL slots ranging from slot #36 to slot #39. The variable k1=2 here.

One technique for selecting a specific $i^{th}$ UL slot from the group of UL slots for transmitting a HARQ feedback information is using the formula i=mod(n, m)+1, where n is the slot at which the PDSCH is received. In the example of PDSCH received in slot #29, then, i=mod(29, 4)+1=2. Thus, the $i^{th}$ UL slot from the group of UL slots is the second UL slot from the group of UL slots, or slot #37.

Figure 11B:
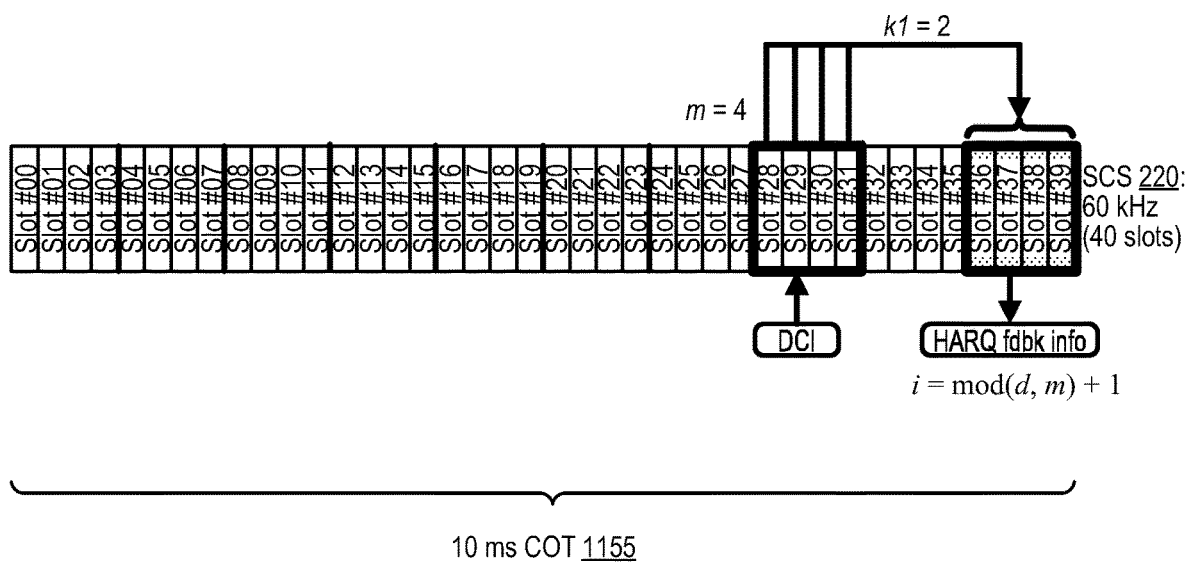
FIG. 11B illustrates use of a rule to determine a specific slot for HARQ feedback within a group of slots.

FIG. 11B illustrates use of a rule to determine a specific slot for HARQ feedback within a group of slots.

The diagram 1150 of FIG. 11B illustrates a 10 ms COT 1155, with time blocks for a 60 kHz SCS 220 where m=4. A DCI for DL assignment (e.g., DCI formal 1_0 or DCI format 1_1) is received in slot #29, which is part of a group of 4 DL slots ranging from slot #28 to slot #31. The DCI schedules a PDSCH (not pictured), and the HARQ feedback information corresponding to the PDSCH is transmitted in slot #37, which is part of a group of 4 UL slots ranging from slot #36 to slot #39. The variable k1=2 here.

Another technique for selecting a specific $i^{th}$ UL slot from the group of UL slots for transmitting a HARQ feedback information is using the formula i=mod(d, m)+1, where d is the slot at which the DCI for DL assignment is received. In the example of the DCI received in slot #29, then, i=mod(29, 4)+1=2. Thus, the $i^{th}$ UL slot from the group of UL slots is the second UL slot from the group of UL slots, or slot #37.

Another technique for selecting a specific $i^{th}$ UL slot from the group of UL slots for transmitting a HARQ feedback information is using unique identifiers, such as a cell radio temporary network identifier (C-RNTI). The C-RNTI is an identifier dedicated to a particular UE and used for scheduling and for identifying a radio resource control (RRC) connection. The gNB assigns different C-RNTI values to different UEs. To select a specific $i^{th}$ UL slot using C-RNTI, the formula i=mod(C−RNTI, m)+1 may be used. For example if the C-RNTI is 666, and m=4, then i=mod(C-RNTI, m)+1=mod(666, 4)+1=3. Thus, the $i^{th}$ UL slot from the group of UL slots is the third UL slot from the group of UL slots, or slot #38 in the context of the diagram 1150.

Another technique for selecting a specific $i^{th}$ UL slot from the group of UL slots for transmitting a HARQ feedback information is to simply use the last slot from the group of UL slots, the first slot from the group of UL slots, the middle slot from the group of UL slots, or the $i^{th}$ slot from the group of UL slots, where j is either a predetermined integer constant or a random number generated using a random number generator.

Figures 12A, 12B:
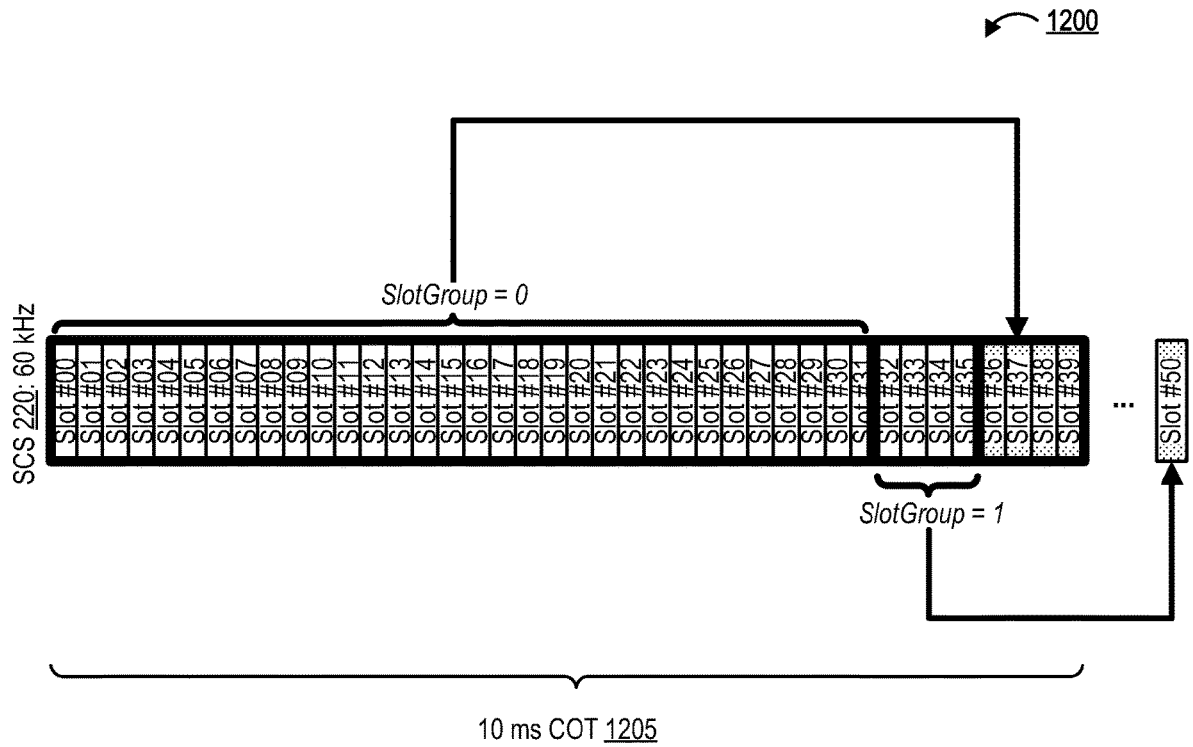
FIG. 12A illustrates a 10 ms channel occupancy time (COT) with a 60 kHz SCS, with all downlink slots in the COT divided into one of two slot groups that each correspond to different HARQ feedback timings.
FIG. 12B is a table illustrating a mapping between the PDSCH-to-HARQ_feedback timing indicator DCI field and the variable k1 that includes an inapplicable value N/A for the variable k1.

FIG. 12A illustrates a 10 ms channel occupancy time (COT) with a 60 kHz SCS, with all downlink slots in the COT divided into one of two slot groups that each correspond to different HARQ feedback timings.

The diagram 1200 of FIG. 12A illustrates a 10 ms COT 1205 with 60 kHz SCS 220. The DL COT 1205 includes 36 DL slots (slots #00 through #35) followed by 4 UL slots (slots #36 through #39). The 36 DL slots are divided into a first group of DL slots and a second group of DL slots based on a value of a slot group indicator SlotGroup. The first group of DL slots includes slots #00 through #31 and is characterized by the slot group indicator value SlotGroup=0. HARQ feedback information for PDSCH(s) received in the first group of DL slots is transmitted in slot #37 within the COT 1205. The second group of DL slots includes slots #32 through #35 and is characterized by the slot group indicator value SlotGroup=1. HARQ feedback information for PDSCH(s) received in the second group of DL slots is transmitted in slot #50 outside of the COT 1205.

The second group of DL slots may be separated from the first group of DL slots because the second group of DL slots may be too close to the group of UL slots #36 through #39 within the COT 1205 for the UE to have enough time to properly receive and decode/process the PDSCH completely enough to transmit HARQ feedback information by slot #36 or another UL slot within the COT 1205. Thus, the second group of DL slots transmits its HARQ feedback information after the COT 1205 is over. In an alternate setup, HARQ feedback information corresponding to PDSCH(s) received during the second group of DL slots may still be transmitted within the COT 1205, just at a later UL slot than slot #36, such as slot #39.

The SlotGroup may be signaled in DCIs, including downlink scheduling DCIs or uplink scheduling DCIs.

FIG. 12B is a table illustrating a mapping between the PDSCH-to-HARQ_feedback timing indicator DCI field and the variable k1 that includes an inapplicable value N/A for the variable k1.

Similarly to the table 400 of FIG. 4, the table 1210 of FIG. 12B maps values in the PDSCH-to-HARQ_feedback timing indicator DCI field to values for the variable k1. The table 1210 includes two columns—a left-hand column 1215 for 3-bit values of the PDSCH-to-HARQ_feedback timing indicator DCI field, and a right-hand column 1220 for values of the variable k1, which in the table start at 8 and increase by iterations of 4 until 32 is reached. One of the values 3-bit values of the PDSCH-to-HARQ_feedback timing indicator DCI field—"111" in the table 1210—maps to an inapplicable value, namely a "not available" (N/A) value. Inapplicable values may alternately be referred to as "N/A," "A/N," or non-numerical. In some cases, the inapplicable "N/A" value for the variable k1 may instead be denoted as a null value, a blank value, a void value, a non-numeric character such as a letter, or some combination thereof.

Figure 13A:
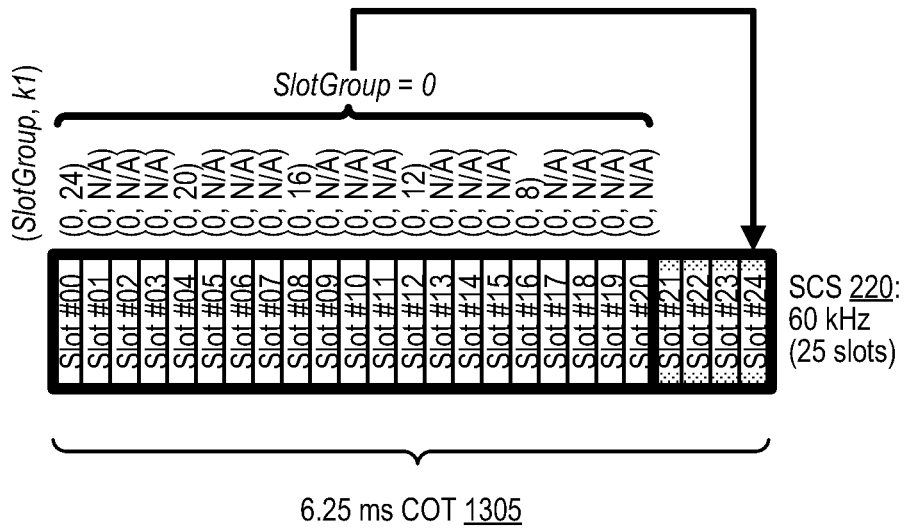
FIG. 13A illustrates a 6.25 ms channel occupancy time (COT) with a 60 kHz SCS, with all downlink slots in the COT in a single slot group that corresponds to a single HARQ feedback timing (slot #24).

FIG. 13A illustrates a 6.25 ms channel occupancy time (COT) with a 60 kHz SCS, with all downlink slots in the COT in a single slot group that corresponds to a single HARQ feedback timing (slot #24).

The diagram 1300 of FIG. 13A illustrates a 6.25 ms COT 1305 with 60 kHz SCS 220. UE receives DCIs for scheduling PDSCHs in one or more of the DL slots of the COT 1305. All 21 DL slots in the COT 1305—that is, slots #00 through #20—are part of a first slot group indicated by the slot group indicator value SlotGroup=0. A group of UL slots is scheduled in slots #21 through #24 in the COT 1305. HARQ feedback information for PDSCH(s) received in the first group of DL slots are transmitted in slot #24 within the COT 1305.

In addition to slot number, a pair of values—SlotGroup and k1—are identified for each slot in the notation format (SlotGroup, k1). The slot group indicator value is set to SlotGroup=0 for scheduling PDSCHs in the group of DL slots #00 through #20. The value for k1 uses values found in the table 1210 of FIG. 12B. Some of the PDSCHs received in the first group of DL slots include an applicable k1 value, which functions as expected—adding k1 to the slot number of each of these slots returns slot #24 as the result. Applicable values may alternately be referred to as numerical values. For example, for the PDSCH received in slot #00, k1=24, the corresponding HARQ feedback information is transmitted in slot #24 (0+24=24). For the PDSCH received in slot #04, k1=20, the corresponding HARQ feedback information is transmitted in slot #24 (4+20=24). For the PDSCH received in slot #08, k1=16, the corresponding HARQ feedback information is transmitted in slot #24 (8+16=24). For PDSCH received in slot #12, k1=12, and slot #24 (12+12=24). For PDSCH received in slot #16, k1=8, and the corresponding HARQ feedback information is transmitted in slot #24 (16+8=24).

A large quantity of the DL slots in the first group of DL slots instead include the inapplicable k1 value "N/A." If the UE receives a DCI for scheduling PDSCH in slot #n, where the DCI received by the UE for scheduling PDSCH in slot #n indicates that k1 has the inapplicable value "N/A" in slot #n, the UE knows to instead determine the HARQ feedback timing based on the slot number and k1 value received through DCI for scheduling PDSCH in slot #n+1 (iterating to the next slot), so long as slot #n+1 shares the same SlotGroup value as slot #n. If slot #n+1 shares the same SlotGroup value as slot #n, and the k1 value received through DCI for scheduling PDSCH in slot #n+1 is also "N/A," the UE knows to determine the HARQ feedback timing based on the slot number and k1 value received through DCI for scheduling PDSCH in slot #n+2 (iterating to the next slot again), so long as slot #n+2 shares the same SlotGroup value as slot #n, and so forth (iterating to #n+3 and onward), until the UE reaches an applicable value for k1 in a slot that shares the same SlotGroup value as slot #n. Thus, if the UE receives a DCI for scheduling PDSCH in slot #2, it identifies the "N/A" value for k1 in slot #2 and moves on to check slot #3. The UE receives the DCI for scheduling PDSCH in slot #3 and again identifies the "N/A" value for k1 in slot #3 and moves on to check slot #4. The UE receives the DCI for scheduling PDSCH in slot #4 and this time identifies an applicable value for k1 namely k1=20. Thus, if a PDSCH is received in slot #2 or slot #3, the UE identifies the HARQ feedback timing to be slot #24 based on the slot number of slot #4 and the applicable k1 value of slot #4 (k1=20).

The UE may receive DCIs for scheduling PDSCH(s) in slots #17-#20. Slots #17-#20 are the last four slots in the group of DL slots, and all have the variable k1 set to the inapplicable "N/A" value. Slot #20 is followed by UL slot #21. Once the UE reaches slots #17-#20, however, it already knows that PDSCHs in the first group of DL slots (with SlotGroup=0) correspond to transmission of HARQ feedback information in slot #24 from having identified this multiple times previously in the first group of DL slots.

Figure 13B:
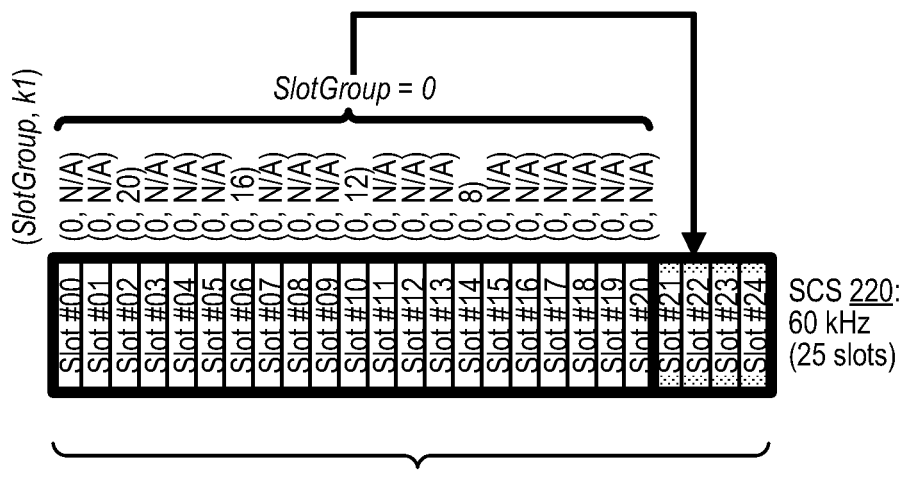
FIG. 13B illustrates a 6.25 ms channel occupancy time (COT) with a 60 kHz SCS, with all downlink slots in the COT in a single slot group that corresponds to a single HARQ feedback timing (slot #22).

FIG. 13B illustrates a 6.25 ms channel occupancy time (COT) with a 60 kHz SCS, with all downlink slots in the COT in a single slot group that corresponds to a single HARQ feedback timing (slot #22).

The diagram 1350 of FIG. 13B illustrates a 6.25 ms COT 1355 with 60 kHz SCS 220. UE receives DCIs for scheduling PDSCH(s) in one or more of the 21 DL slots in the COT 1355—that is, slots #00 through #20—which are part of a first slot group indicated by the slot group indicator value SlotGroup=0. A group of UL slots is scheduled in slots #21 through #24 in the COT 1355. HARQ feedback information for PDSCH(s) received in the first group of DL slots are transmitted in slot #22 within the COT 1355. Like the diagram 1300 of FIG. 13A, the diagram 1350 of FIG. 13B lists the SlotGroup and k1 value for each downlink slot. Compared to the k1 values in the diagram 1300 of FIG. 13A, the applicable k1 values in the diagram 1350 of FIG. 13B are shifted two slots earlier, resulting in HARQ feedback transmission in slot #22 rather than slot #24.

Figure 14:
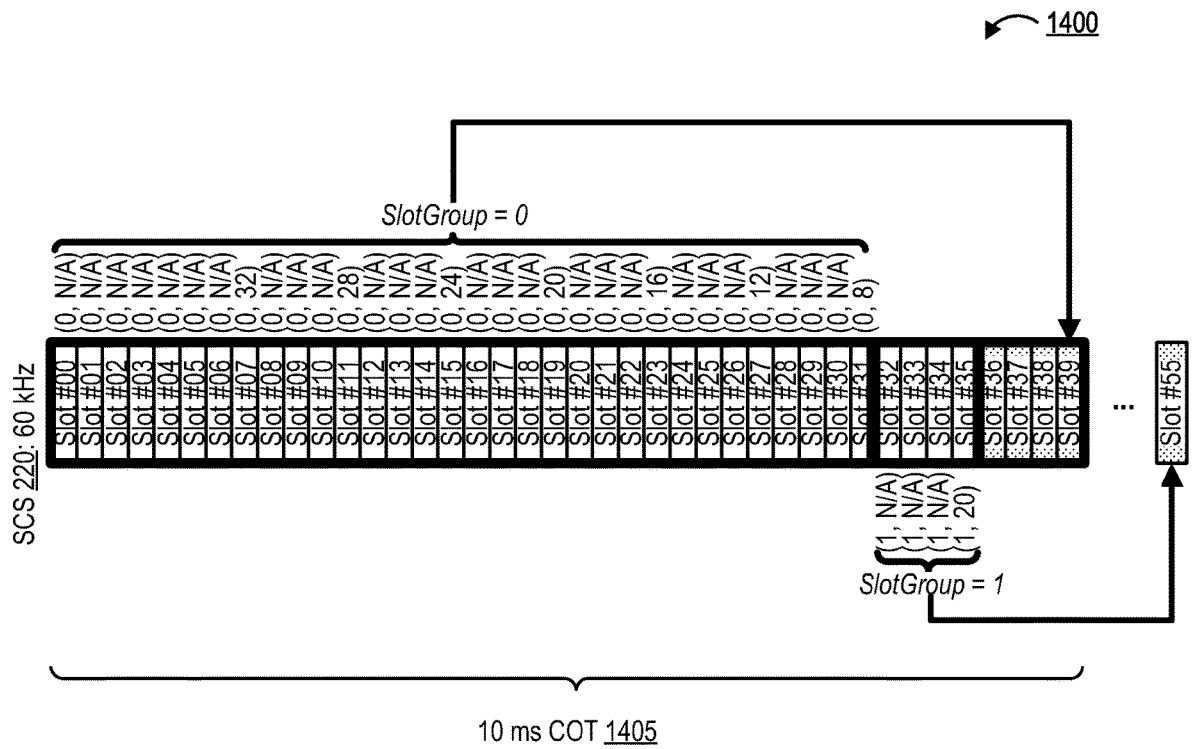
FIG. 14 illustrates the 10 ms channel occupancy time (COT) of FIG. 12, with indicators for DCI parameters added.

FIG. 14 illustrates the 10 ms channel occupancy time (COT) of FIG. 12, with indicators for DCI parameters added.

The diagram 1400 of FIG. 14 illustrates a 10 ms COT 1405 with a slot configuration similar to that of the diagram 1200 of FIG. 12. In the diagram 1400, however, the HARQ feedback information for PDSCH(s) received in the first group of DL slots is transmitted in slot #39 instead of slot #37, and the HARQ feedback information for PDSCH(s) received in the second group of DL slots is transmitted in slot #55 instead of slot #50. The diagram 1400 also includes a pair of values—SlotGroup and k1—are identified for each PDSCH received in the slot in the notation format (Slot-Group, k1) as in the diagrams 1300 and 1350 of FIGS. 13A and 13B. As with the diagrams 1300 and 1350 of FIGS. 13A and 13B, k1 is set to the inapplicable value "N/A" for a significant quantity of DL slots. For those DL slots with k1=N/A, the UE knows to rely on the slot number and k1 value of the next slot that shares the same SlotGroup value in order to identify the UL slot at which to transmit the HARQ feedback information.

Some of the PDSCHs in the diagram 1400 slots include an applicable k1 value, which functions as discussed previously—adding k1 to the slot number each slot in the first group of DL slots with an applicable k1 value returns slot #39 as the result for the slot in which to transmit the corresponding HARQ feedback information, as discussed previously. For example, for PDSCH received in slot #07, k1=32, and the corresponding HARQ feedback information is transmitted in slot #39 (7+32)=39. For PDSCH received in slot #11, k1=28, and the corresponding HARQ feedback information is transmitted in slot #39 (11+28=39). For PDSCH received in slot #15, k1=24, and the corresponding HARQ feedback information is transmitted in slot #39 (15+24=39). For PDSCH received in slot #19, k1=20, and the corresponding HARQ feedback information is transmitted in slot #39 (19+20=39). For PDSCH received in slot #23, k1=16, and the corresponding HARQ feedback information is transmitted in slot #39 (23+16=39). For PDSCH received in slot #31, k1=8, and the corresponding HARQ feedback information is transmitted in slot #39 (31+8=39). For PDSCH(s) received in the second group of DL slots (where SlotGroup=1), only slot #35 has an applicable k1 value, set to k1=20. The sum 35+20=55, meaning that, for PDSCH(s) received in the second group of DL slots (where Slot-Group=1), the corresponding HARQ feedback information is transmitted in slot #55.

FIG. 15A illustrates a first set of operations for HARQ configuration.

The operations 1500 of FIG. 15A may be performed by a UE. At block 1505, the UE receives a first downlink control information (DCI). The first DCI schedules a first physical downlink shared channel (PDSCH) in a first downlink slot that is within a first slot group. The first DCI includes a first slot group indicator identifying the first slot group and a first PDSCH-to-HARQ_feedback timing indicator.

At block 1510, the UE receives, during a first downlink slot, the first PDSCH as scheduled according to the first DCI. At block 1515, the UE determines, based on the first PDSCH-to-HARQ_feedback timing indicator (and in some cases the first slot group and/or other data in the first DCI), that a first hybrid automatic repeat request (HARQ) feedback corresponding to the first PDSCH is to be transmitted in a first uplink slot. At block 1520, the UE transmits the first HARQ feedback information corresponding to the first PDSCH in the first uplink slot.

In some cases, the first PDSCH-to-HARQ_feedback timing indicator is an applicable value. In some cases, a slot number of the first uplink slot is identified to be a sum of the first PDSCH-to-HARQ_feedback timing indicator and a slot number of the first downlink slot.

In some cases, the first PDSCH-to-HARQ_feedback timing indicator is an inapplicable value (e.g., value=N/A). In some cases, a slot number of the first uplink slot is identified to be a sum of a second PDSCH-to-HARQ_feedback timing indicator and a slot number of a second downlink slot, wherein the second PDSCH-to-HARQ_feedback timing indicator is an applicable value and is part of a second DCI received after the first DCI.

In some cases, the first slot group indicator is a 1-bit value (e.g., 0 or 1). In some cases, the first downlink slot is within a first channel occupancy time (COT). In some cases, the first uplink slot is within the first COT. In some cases, the first uplink slot is outside of the first COT.

In some cases, the operations 1500 may also include further operations. For instance, the UE may receive a second DCI, the second DCI scheduling a second PDSCH in a second downlink slot. The second DCI includes a second slot group indicator and a second PDSCH-to-HARQ_feedback timing indicator. The UE may receive, during the second downlink slot, the second PDSCH as scheduled according to the second DCI. The UE may determine, based on the second DCI, that a second HARQ feedback information corresponding to the second PDSCH is to be transmitted in a second uplink slot. The UE may transmit the second HARQ feedback information corresponding to the second PDSCH in the second uplink slot. In some cases, the first uplink slot and the second uplink slot are within a first channel occupancy time (COT). In some cases, the first uplink slot is within a first channel occupancy time (COT) and the second uplink slot is outside of the first COT. In some cases, the first slot group indicator is equal to the second slot group indicator, and the first uplink slot is the second uplink slot. In some cases, the first slot group indicator is different from the second slot group indicator, and the first uplink slot and the second uplink slot are different.

In some cases, HARQ feedback information corresponding to the first slot group is carried in a HARQ codebook, wherein determining that the first HARQ feedback information is to be transmitted in a first uplink slot is based on a previous HARQ codebook for a previous slot group before the first slot group. In some cases, the UE determines, based on the HARQ codebook, that a second HARQ feedback information corresponding to a second PDSCH is to be transmitted in a second uplink slot despite failing to receive a second DCI, the second DCI scheduling a second PDSCH in a second downlink slot that is within the first slot group. In some cases, the HARQ codebook has a dynamic size. In some cases, the previous HARQ codebook has a pre-determined size. In some cases, the previous HARQ codebook stores one or more padding bits following encoding the HARQ feedback information corresponding to the first slot group. In some cases, the pre-determined size of the previous HARQ codebook is based on a maximum downlink HARQ process number, a number of configured serving cells, and/or a maximum code block grouping (CBG) number.

Figure 15B:
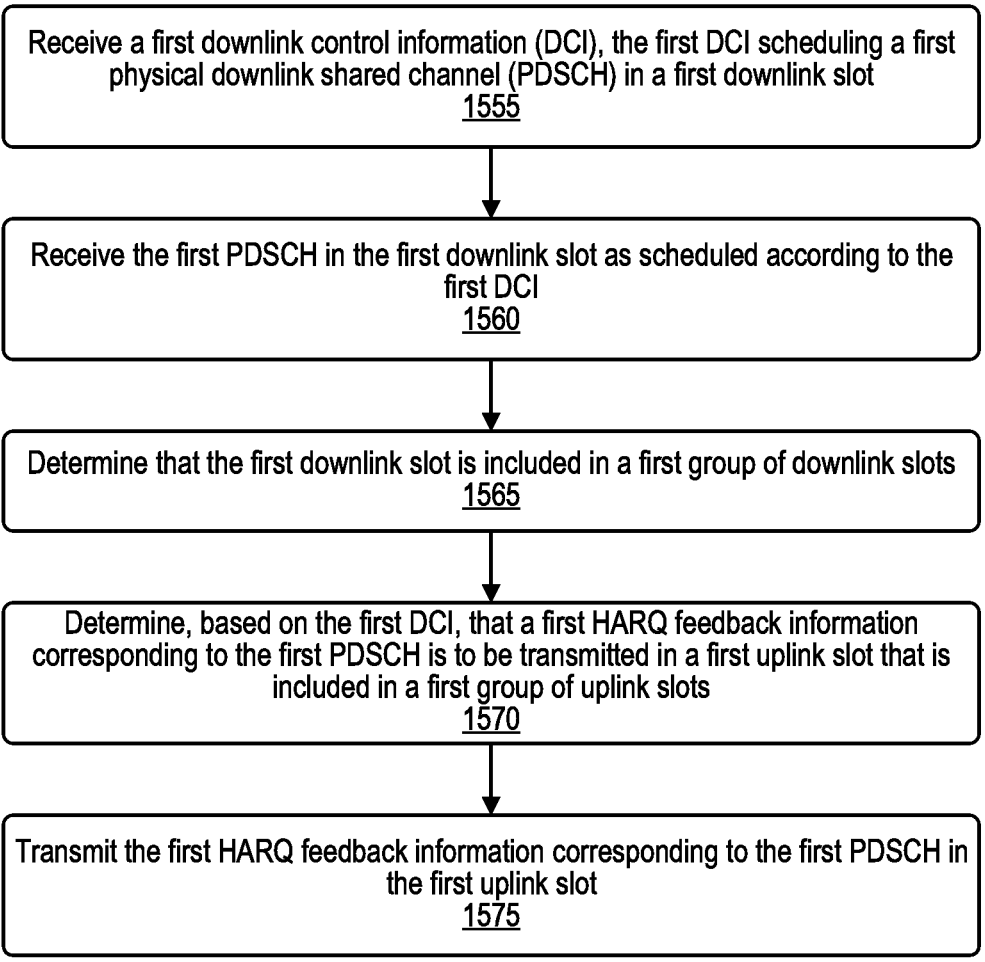
FIG. 15B illustrates a second set of operations for HARQ configuration.

FIG. 15B illustrates a second set of operations for HARQ configuration.

The operations 1550 of FIG. 15B may be performed by a UE. At block 1555, the UE receives receiving a first downlink control information (DCI). The first DCI schedules a first physical downlink shared channel (PDSCH) in a first downlink slot. At block 1560, the UE receives the first PDSCH in the first downlink slot as scheduled according to the first DCI.

At block 1565, the UE determines that the first downlink slot is included in a first group of downlink slots. At block 1570, the UE determines, based on the first DCI, that a first HARQ feedback information corresponding to the first PDSCH is to be transmitted in a first uplink slot that is included in a first group of uplink slots. At block 1575, the UE transmits the first HARQ feedback information corresponding to the first PDSCH in the first uplink slot.

In some cases, the first downlink slot is within a first channel occupancy time (COT). In some cases, the first uplink slot is within the first COT. In some cases, the first uplink slot is outside of the first COT.

In some cases, determining that the first downlink slot is included within the first group of downlink slots is based on calculating a reference slot number n' of the downlink slot. Here, n' is derived by a function of n and m, where n is a slot number of the first downlink slot and m is a parameter identifying a quantity of slots in the first group of downlink slots. In some cases, the value of m is based on subcarrier spacing (SCS). In some cases, the value of m is based on a bit-field size of at least one PDSCH-to-HARQ_feedback timing indicator field in the first DCI. In some cases, the value of m is based on a length of a first channel occupancy time (COT). In some cases, the value of m is based on a maximum channel occupancy time (COT). In some cases, the value of m is based on numerology.

In some cases, prior to transmitting the first HARQ feedback information, the UE identifies the first group of uplink slots by identifying a function of n', m, k1, k2 where k1 is given by the first DCI and k2∈{0, ..., m–1}. In some cases, prior to transmitting the first HARQ feedback information, the UE identifies the first uplink slot to be an $i^{th}$ slot of the first group of uplink slots, wherein i is derived by a function of m and n, wherein m is a quantity of slots in the first group of uplink slots, and wherein n is a slot number of a downlink slot carrying a latest PDSCH. In some cases, prior to transmitting the first HARQ feedback information, the UE identifies the first uplink slot to be an $i^{th}$ slot of the first group of uplink slots, wherein i is derived by a function of m and n, wherein m is a quantity of slots in the first group of uplink slots, and wherein n is a slot number of a downlink slot carrying the latest DCI for scheduling PDSCH. In some cases, prior to transmitting the first HARQ feedback information, the UE identifies the first uplink slot to be an $i^{th}$ slot of the first group of uplink slots, wherein i is derived by a function comprising m and C-RNTI, wherein m is a quantity of slots in the first group of uplink slots, wherein C-RNTI is an identifier assigned to the UE by a base station. In some cases, prior to transmitting the first HARQ feedback information, the UE identifies the first uplink slot to be a predetermined slot of the first group of uplink slots. In some cases, prior to transmitting the first HARQ feedback information, the UE identifies the first uplink slot to be a last slot of the first group of uplink slots.

In some cases, the first HARQ feedback information is a HARQ acknowledgment (ACK). In some cases, transmitting the first HARQ feedback information includes transmitting the first HARQ feedback information through a physical uplink control channel (PUCCH). In some cases, transmitting the first HARQ feedback includes multiplexing the first HARQ feedback information with a physical uplink shared channel (PUSCH). In some cases, the plurality of slots in any one of the slot groups discussed with respect to the operations 1500 and/or 1550 may be a plurality of consecutive slots.

Figure 26:
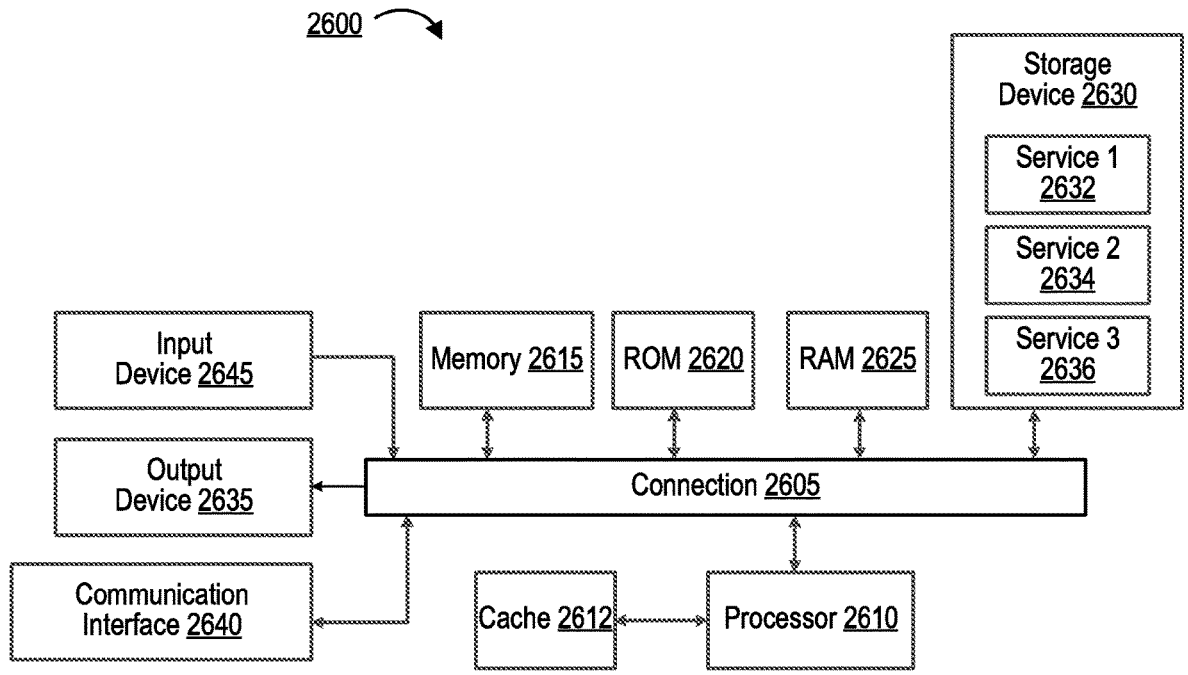
FIG. 26 is a diagram illustrating an example of a system for implementing certain aspects of the present technology.

In some examples, the operations 1500 and/or 1550 may be performed by a computing device or apparatus, such as a computing device having the computing system 2600 shown in FIG. 26. In one example, the operations 1500 and/or 1550 can be performed by a user equipment (UE), which can include a mobile device (e.g., a mobile phone), a wearable device, a server (e.g., in a software as a service (SaaS) system or other server-based system), and/or any other computing device with the resource capabilities to perform the operations 1500 and/or 1550. In some cases, the computing device or apparatus may include various components, such as one or more input devices, one or more output devices, one or more processors, one or more microprocessors, one or more microcomputers, and/or other component that is configured to carry out the operations 1500 and/or 1550. In some examples, the computing device may include a display, a network interface configured to wirelessly (and/or over a wired connection) communicate and/or receive the data, any combination thereof, and/or other component(s).

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The operations 1500 and 1550 are illustrated as logical flow diagrams, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the operations 1500 and/or 1550 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Additionally, a non-transitory computer-readable medium may be provided having stored thereon instructions that, when executed by one or more processors, cause the one or more processors to perform the operations 1500 and/or 1550.

Figure 16:
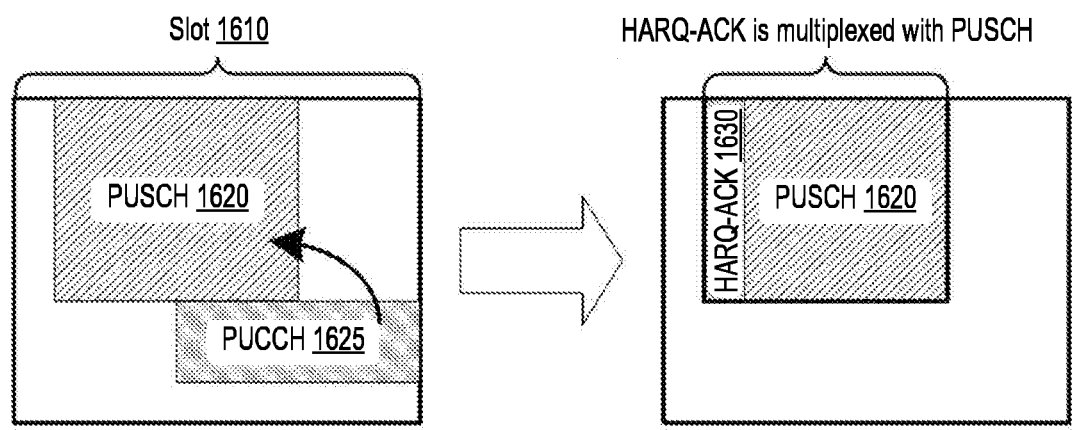
FIG. 16 illustrates a collision between the physical uplink control channel (PUCCH) with the physical uplink shared channel (PUSCH) that may result in a HARQ-ACK being multiplexed with PUSCH.

FIG. 16 illustrates a collision between the physical uplink control channel (PUCCH) with the physical uplink shared channel (PUSCH) that may result in a HARQ-ACK being multiplexed with PUSCH.

HARQ feedback information, such as a HARQ-ACK 1630, is normally transmitted by the UE to the gNB over a physical uplink control channel (PUCCH) transmission 1625. A physical uplink shared control channel (PUSCH) transmission 1620 may sometimes be scheduled in the same slot 1610 as the PUCCH transmission 1625. In this type of collision, one or more HARQ-ACK(s) from the PUCCH transmission 1625 may be multiplexed with PUSCH 1620 as illustrated in the diagram 1600.

Figure 17:
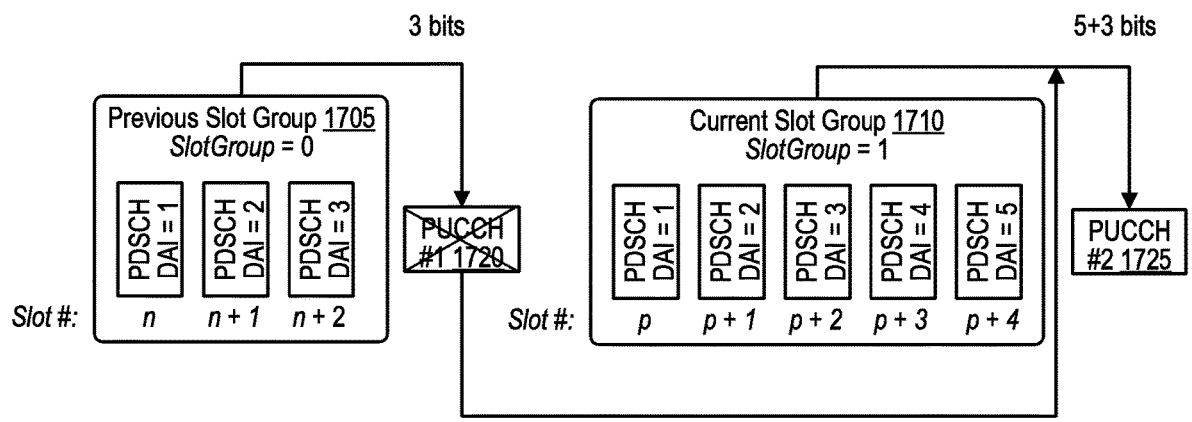
FIG. 17 illustrates a situation in which HARQ feedback carried in PUCCH #1 is not received by the gNB.

FIG. 17 illustrates a situation in which HARQ feedback carried in PUCCH #1 is not received by the gNB.

The diagram 1700 of FIG. 17 illustrates a previous slot group 1705 and a current slot group 1710 that is set after the previous slot group 1705. The previous slot group 1705 corresponds to a slot group indicator SlotGroup set to SlotGroup=0, and includes three PDSCHs received by the UE. The UE is intends to transmit HARQ feedback information for the three PDSCHs of the previous slot group 1705 through PUCCH 1720, but the gNB does not receive the PUCCH 1720 from the UE. In some cases, the UE does not perform LBT successfully and therefore does not transmit PUCCH to the gNB. In some cases, the UE performs LBT successfully and transmits PUCCH, but gNB does not receive PUCCH, for example due to a hidden node problem or due to interference. In NR-U, HARQ feedback may be transmitted in unlicensed spectrum, where HARQ feedback transmission may suffer interference from other devices operating in the unlicensed spectrum. This may reduce the reliability of HARQ feedback reaching the gNB.

The current slot group 1710 corresponds to a slot group indicator SlotGroup set to SlotGroup=1, and includes five PDSCHs received by the UE. The UE schedules transmission of HARQ feedback information for the five PDSCHs of the current slot group 1710 as well as the HARQ feedback information for the three PDSCHs of the previous slot group 1705 through PUCCH 1725. In this way, the current slot group 1710 is able to compensate for HARQ feedback information receipt issues faced by the previous slot group 1705. In some cases, the current slot group 1710 may be in the same COT as the previous slot group. In other cases, the current slot group 1710 is in a different COT than the previous slot group.

Figure 18A:
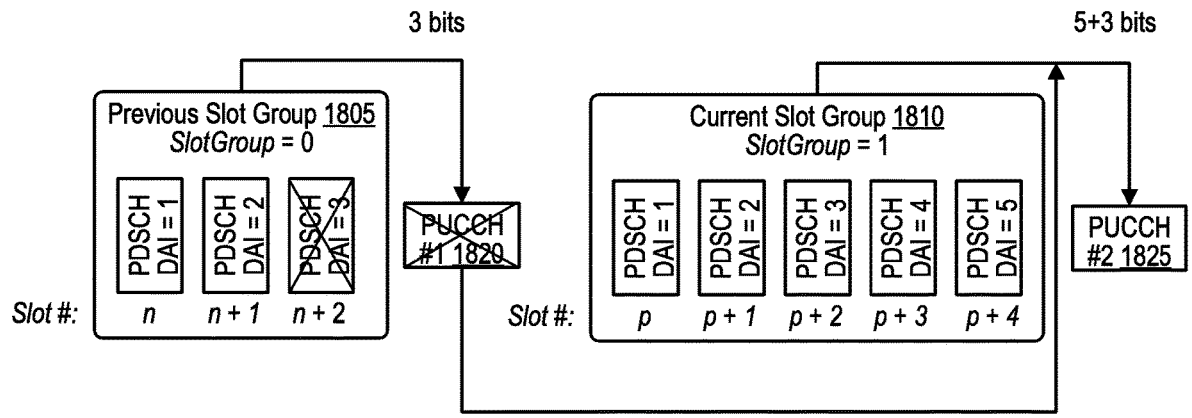
FIG. 18A illustrates, from the perspective of the gNB, a situation in which HARQ feedback carried in PUCCH #1 is not received by the gNB after the UE misses a DCI, causing misalignment in HARQ payload size sent by the UE versus HARQ payload size expected by the gNB.

FIG. 18A illustrates, from the perspective of the gNB, a situation in which HARQ feedback carried in PUCCH #1 is not received by the gNB after the UE misses a DCI, causing misalignment in HARQ payload size sent by the UE versus HARQ payload size expected by the gNB.

The diagram 1800 of FIG. 18A illustrates a previous slot group 1805 and a current slot group 1810 that are similar to the previous slot group 1705 and the current slot group 1710 of FIG. 7, but where the UE failed to receive a DCI from the gNB, the DCI for scheduling the third PDSCH of the previous slot group 1805. Because the gNB sent 3 DCIs and 3 PDSCHs for the previous slot group 1805 to the UE, the gNB expects to see 3 HARQ feedback information bits in the PUCCH 1820 corresponding to the three PDSCHs in the previous slot group 1805. Like the PUCCH 1720 of the diagram 1700, however, the PUCCH 1820 is not received by the gNB. The gNB then expects the UE to try to submit those three bits corresponding to the previous slot group 1805 as part of the PUCCH 1825 for the current slot group 1810, along with HARQ feedback information for the five PDSCHs received by the UE in the current slot group 1810.

Figure 18B:
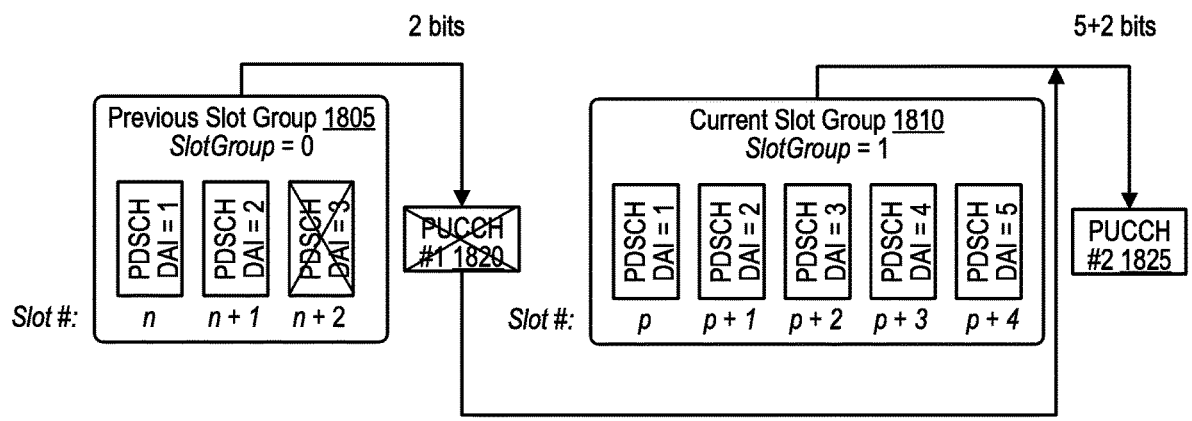
FIG. 18B illustrates the situation of FIG. 18A from the perspective of the UE.

FIG. 18B illustrates the situation of FIG. 18A from the perspective of the UE.

The diagram 1850 of FIG. 18B illustrates the situation in the diagram 1850 of FIG. 18A, but from the perspective of the UE rather than the expectations of the gNB. The UE keeps track of received data using a codebook, sometimes referred to as a HARQ codebook, a HARQ feedback codebook, or a HARQ-ACK codebook. The size of a dynamic codebook is based on the downlink assignment index (DAI) field of DCI received by the UE from the gNB. Since the UE does not receive the third PDSCH of the previous slot group 1805, and does not receive DCI for the third PDSCH of the previous slot group 1805, the UE does not expand its dynamic codebook. Since the UE has no way to know that the third PDSCH of the previous slot group 1805 was sent to the UE, and that the gNB expects HARQ feedback information based on this third PDSCH, it does not even attempt to provide HARQ feedback information for the third PDSCH. Instead, the UE only provides HARQ feedback information on, or attempts to provide HARQ feedback information on, two bits corresponding to the first and second PDSCHs in the previous slot group 1805, omitting the third. Like the PUCCH 1720 of the diagram 1700, the PUCCH 1820 is not received by the gNB. Thus, the UE propagates the error by transmitting the 2 bits on to the PUCCH 1825 transmit the HARQ feedback information for the previous slot group 1805 along with the 5 bits for the HARQ feedback information for the current slot group 1810 itself. The gNB, expecting to receive 5+3=8 bits of HARQ feedback information from the UE, will instead receive 5+2=7 bits of HARQ feedback information from the UE. This error may cascade further, causing the HARQ feedback payload size misalignment between the gNB and the UE.

Handling communication operations of a UE in a wireless communication scenario in some cases may include receiving a slot group indicator (e.g., SlotGroup=0 or SlotGroup=1) and receiving DCI for scheduling PDSCH, the DCI including a DAI and a HARQ process number. Handling communication operations of a UE may include receiving the PDSCH, receiving information for carrying HARQ-ACK of at least one previous slot group and obtaining a codebook size for carrying HARQ-ACK. The dynamic codebook size of current slot group may be determined according to DAI.

The semi-static codebook size of previous slot group is known to gNB. Handling communication operations of a UE may include if there is at least one PDSCH transmitted in the current slot group, obtaining a PUCCH resource for a HARQ feedback information. The PUCCH resource may be predefined/preconfigured or based on the DAI. Handling communication operations of a UE may include transmitting the corresponding HARQ-ACK in a third slot. If there is a collision between PUCCH and PUSCH in the third slot, the HARQ-ACK is multiplexed with PUSCH.

Figure 19:
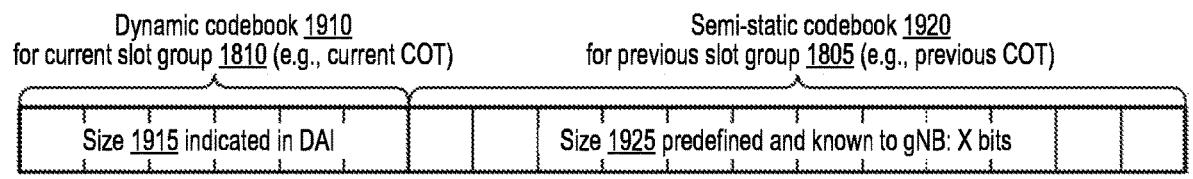
FIG. 19 illustrates use of a dynamic codebook for a current slot group and a semi-static codebook for a previous slot group to resolve the misalignment of FIGS. 18A-B.

FIG. 19 illustrates use of a dynamic codebook for a current slot group and a semi-static codebook for a previous slot group to resolve the misalignment of FIGS. 18A-B.

The diagram 1900 illustrates a dynamic codebook 1910 for the current slot group 1810, and a semi-static codebook 1920 for the previous slot group 1805. The size 1915 of the dynamic codebook 1910 is indicated in DAI but otherwise unknown to the gNB, though gNB may blindly decode its size. On the other hand, the size 1925 of the semi-static codebook 1920 is known to the gNB, and the gNB need not blindly guess the size 1925 of the semi-static codebook 1920. Having a predetermined number of bits in the semi-static codebook 1920 prevents a misunderstanding between the gNB and the UE regarding how many bits of HARQ feedback information are being transmitted from the UE to the gNB, and received by the gNB, either at PUCCH 1820 or PUCCH 1825.

In some cases, the current slot group 1810 may be at least a part of a current COT, and the dynamic codebook 1910 may be associated with the current COT. Likewise, the previous slot group 1805 may be at least a part of a previous COT before the current COT, and the semi-static codebook 1920 may be associated with the previous COT.

Figure 20:
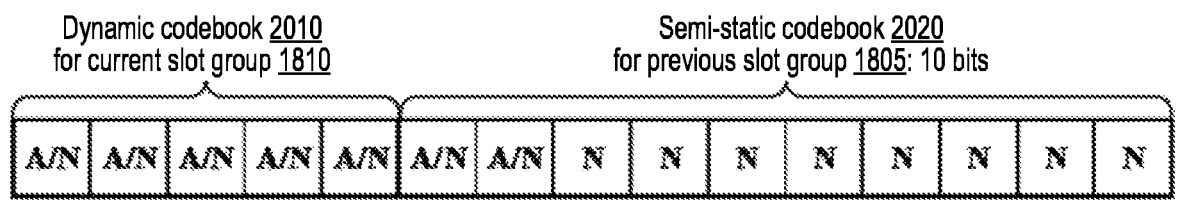
FIG. 20 illustrates a semi-static codebook whose size is based on the maximum COT, the number of serving cells, and the maximum code block grouping (CBG) number.

FIG. 20 illustrates a semi-static codebook whose size is based on the maximum COT, the number of serving cells, and the maximum code block grouping (CBG) number.

In particular, the diagram 2000 illustrates a dynamic codebook 2010 for the current slot group 1810 as well as a semi-static codebook 2020 for the previous slot group 1805. The dynamic codebook 2010 is illustrated as 5 bits long due to the 5 DCIs and corresponding DAIs and PDSCHs. Each bit of the dynamic codebook 2010 indicates an "A/N," meaning that each can be either an ACK or a NACK depending on receipt and decoding/processing of each PDSCH of the current slot group 1810.

The semi-static codebook 2020 is 10 bits long based on a formula for size of the semi-static codebook as being equal to a (maximum COT size) (number of serving cells) (maximum CBG number)=10·1·1=10. The first two bits of the semi-static codebook 2020 each indicate an A/N," meaning that each can be either an ACK or a NACK. These two bits correspond to the first PDSCH and the second PDSCH of the previous slot group 1805, since those are the only two PDSCHs for which the UE received DCIs. The remaining 8 bits are filled with NACKs. Thus, the gNB will interpret the semi-static codebook as indicating an intentional NACK corresponding to the third PDSCH, while the UE will see the same NACK as harmless filler, solving the misalignment.

Figure 21:
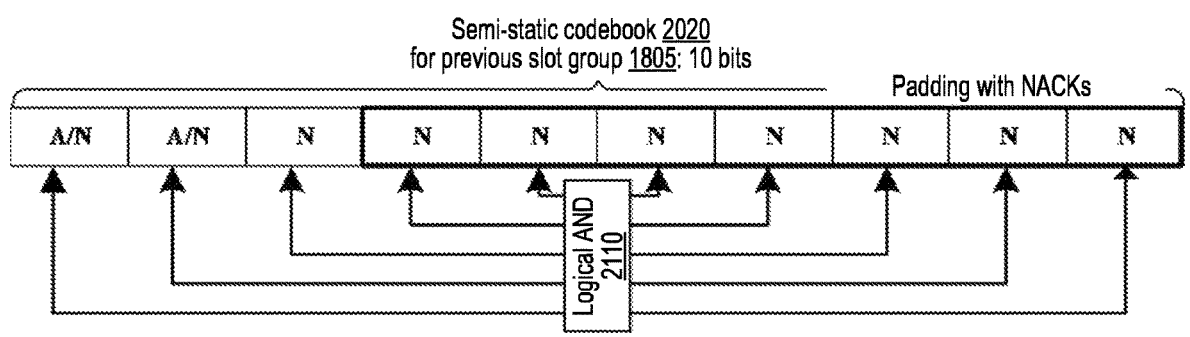

FIG. 21 illustrates padding of the semi-static codebook with NACKs, and compaction of the semi-static codebook using a logical AND.

In particular, the diagram 2100 illustrates the semi-static codebook 2020 of FIG. 20, which is still 10 bits long and padded with NACKs after the first two "A/N" bits. The diagram 2100 also illustrates a logical AND operation 2110 that may be used as a compaction scheme. The compaction scheme cuts the size of the semi-static codebook 2020 in half by performing an AND operation on each bit and its opposite about the middle of the semi-static codebook 2020 as illustrated with the arrows of the diagram 2100. Essentially, the semi-static codebook 2020 is being "folded" in half, with the two sides meeting together with an AND operation 2110. In some cases, a logical "OR" operation, or a logical "XOR" operation, may be used in place of, or in addition to, the "AND" operation 2110

Figure 22:
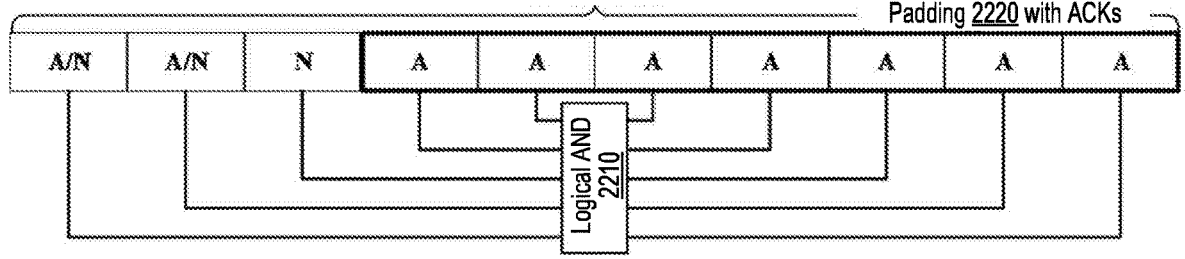

FIG. 22 illustrates padding of the semi-static codebook with ACKs, and compaction of the semi-static codebook using a logical AND.

The diagram 2200 illustrates a semi-static codebook 2230 similar to the semi-static codebook 2020 of FIG. 20, which is still 10 bits long, but is now padded 2220 with ACKs rather than NACKs as it was in FIGS. 20-21, and a NACK is added in the third bit corresponding to the third PDSCH of the previous slot group 1805 for which the UE did not receive DCI. Padding with ACKs allows the logical AND operation 2210 of FIG. 22 to compact the semi-static codebook 2230 to make it half the size without sacrificing accuracy, since other existing ACKs will be preserved, while existing NACKs will remain as NACKs. The logical AND operation 2210 functions as a compaction scheme by performing an AND operation on each bit and its opposite about the middle of the semi-static codebook 2230 as illustrated with the arrows of the diagram 2100. Essentially, the semi-static codebook 2230 is being "folded" in half, with the two sides meeting together with an AND operation 2210.

The ACK fill and compaction scheme may in some cases be used when the slot turns to uplink, and may be performed using a predefined/preconfigured rule. In some cases, a logical "OR" operation, or a logical "XOR" operation, may be used in place of, or in addition to, the "AND" operation 2210.

Figure 23:
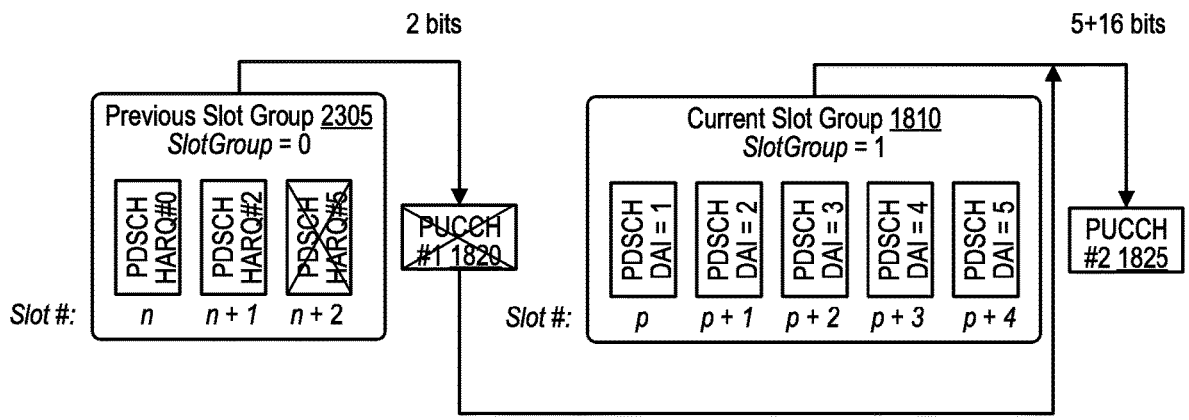
FIG. 23 illustrates a semi-static codebook whose size is based on the maximum DL HARQ process number, the number of configured serving cells, and the maximum code block grouping (CBG) number.

FIG. 23 illustrates a semi-static codebook whose size is based on the maximum DL HARQ process number, the number of configured serving cells, and the maximum code block grouping (CBG) number.

The diagram 2300 illustrates a modified variant of the situation of FIG. 18B in that the three PDSCHs of the previous slot group 2305 now include indications of HARQ

0, HARQ #2, and HARQ #5, respectively, indicating where in the semi-static codebook 2320 the corresponding HARQ feedback information should be positioned. Thus, an "A/N" is visible in bit zero of the semi-static codebook 2320 corresponding to the first PDSCH indicated as HARQ #0 in the previous slot group 2305. Likewise, an "A/N" is visible in bit two of the semi-static codebook 2320 corresponding to the second PDSCH indicated as HARQ #2 in the previous slot group 2305. The third PDSCH of the previous slot group 2305 is still not received by the UE and thus may in some cases not impact the semi-static codebook 2320, or alternately may force an "N" in bit 5 of the semi-static codebook 2320. The rest of the semi-static codebook 2320 is padded with NACKs, as in FIG. 22.

The semi-static codebook 2320 is 16 bits long because a function was used to determine the length of the semi-static codebook 2320, the function being (maximum DL HARQ process number)·(number of configured serving cell)·(maximum CBG number)=16·1·1=16.

Figure 24:
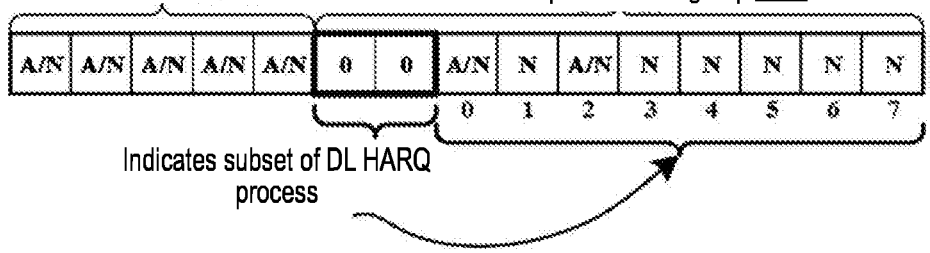
FIG. 24 illustrates a semi-static codebook that indicates a first subset of DL HARQ processes for HARQ-ACK feedback.

FIG. 24 illustrates a semi-static codebook 2400 that indicates a first subset of DL HARQ processes for HARQ-ACK feedback.

A table 2410 is illustrated in FIG. 24 mapping two-bit values to DL HARQ process numbers. The table 2410 is used to compact the semi-static codebook 2320 into the compacted semi-static codebook 2420. Specifically, the first two bits (00) of the semi-static codebook 2420 indicate which eight HARQ processes are identified in the remainder of the semi-static codebook 2420. The table 2410 indicates that these two bits (00) correspond to DL HARQ processes number 0, 1, 2, 3, 4, 5, 6, and 7. Thus, the compacted semi-static codebook 2420 presents only that subset, the UE and/or gNB assume that the bits that were left out are NACK bits. Alternately, the UE and/or gNB may assume that the bits that were left out are ACK bits. Either way, this reduces the size of the semi-static codebook 2320 from 16 bits to 10.

Figure 25:
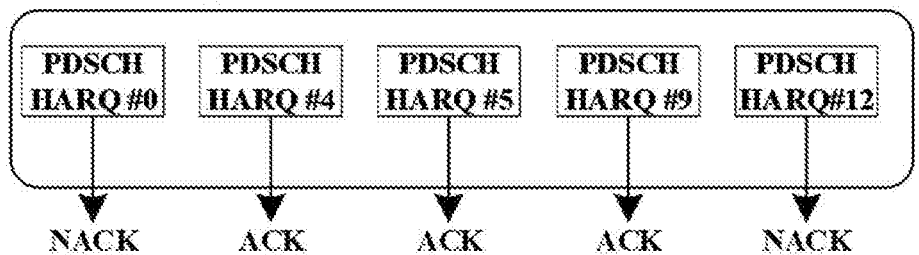
FIG. 25 illustrates a semi-static codebook that indicates a second subset of DL HARQ processes for HARQ-ACK feedback.

FIG. 25 illustrates a semi-static codebook 2500 that indicates a second subset of DL HARQ processes for HARQ-ACK feedback.

The table 2410 of FIG. 24 is included again in FIG. 25. A previous slot group 2505 includes listed values certain DL HARQ processes. A semi-static codebook 2520 corresponding to the previous slot group 2505 is compacted based on the table 2410. Specifically, the first two bits (01) of the semi-static codebook 2520 indicate which eight HARQ processes are identified in the remainder of the semi-static codebook 2520. The table 2410 indicates that these two bits (01) correspond to DL HARQ processes number 4, 5, 6, 7, 8, 9, 10, and 11. Thus, the compacted semi-static codebook 2420 presents only that subset, the UE and/or gNB assume that the bits that were left out are NACK bits. Alternately, the UE and/or gNB may assume that the bits that were left out are ACK bits. Either way, this reduces the size of the semi-static codebook 2520 from 16 bits to 10.

FIG. 26 is a diagram illustrating an example of a system for implementing certain aspects of the present technology. In particular, FIG. 26 illustrates an example of computing system 2600, which can be for example any computing device making up internal computing system, a remote computing system, a camera, or any component thereof in which the components of the system are in communication with each other using connection 2605. Connection 2605 can be a physical connection using a bus, or a direct connection into processor 2610, such as in a chipset architecture. Connection 2605 can also be a virtual connection, networked connection, or logical connection.

In some embodiments, computing system 2600 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 2600 includes at least one processing unit (CPU or processor) 2610 and connection 2605 that couples various system components including system memory 2615, such as read-only memory (ROM) 2620 and random access memory (RAM) 2625 to processor 2610. Computing system 2600 can include a cache 2612 of high-speed memory connected directly with, in close proximity to, or integrated as part of processor 2610.

Processor 2610 can include any general purpose processor and a hardware service or software service, such as services 2632, 2634, and 2636 stored in storage device 2630, configured to control processor 2610 as well as a special-purpose processor where software instructions are incorporated into the actual processor design. Processor 2610 may essentially be a completely self-contained computing system, containing multiple cores or processors, a bus, memory controller, cache, etc. A multi-core processor may be symmetric or asymmetric.

To enable user interaction, computing system 2600 includes an input device 2645, which can represent any number of input mechanisms, such as a microphone for speech, a touch-sensitive screen for gesture or graphical input, keyboard, mouse, motion input, speech, etc. Computing system 2600 can also include output device 2635, which can be one or more of a number of output mechanisms known to those of skill in the art. In some instances, multimodal systems can enable a user to provide multiple types of input/output to communicate with computing system 2600. Computing system 2600 can include communications interface 2640, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 2640 may also include one or more Global Navigation Satellite System (GNSS) receivers or transceivers that are used to determine a location of the computing system 2600 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 2630 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L#), resistive random-access memory (RRAM/ReRAM), phase change memory (PCM), spin transfer torque RAM (STT-RAM), another memory chip or cartridge, and/or a combination thereof.

The storage device 2630 can include software services, servers, services, etc., that when the code that defines such software is executed by the processor 2610, it causes the system to perform a function. In some embodiments, a hardware service that performs a particular function can include the software component stored in a computer-readable medium in connection with the necessary hardware components, such as processor 2610, connection 2605, output device 2635, etc., to carry out the function.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" means A, B, or A and B. In another example, claim language reciting "at least one of A, B, and C" means A, B, C, or A and B, or A and C, or B and C, or A and B and C. The language "at least one of" a set and/or "one or more" of a set does not limit the set to the items listed in the set. For example, claim language reciting "at least one of A and B" can mean A, B, or A and B, and can additionally include items not listed in the set of A and B.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

What is claimed is:

1. A method of hybrid automatic repeat request (HARQ) configuration by a user equipment (UE), the method comprising:
    receiving a first downlink control information (DCI), wherein the first DCI schedules a first physical downlink shared channel (PDSCH) in a first downlink slot that is within a first slot group, wherein the first DCI includes a first slot group indicator identifying the first slot group and a first PDSCH-to-HARQ_feedback timing indicator, and wherein the first PDSCH-to-HARQ_feedback timing indicator is an inapplicable value;
    receiving, the first PDSCH, wherein the first PDSCH is received during the first downlink slot, and wherein the first PDSCH is received as scheduled according to the first DCI;
    receiving a second DCI, wherein the second DCI is received after the first DCI, wherein the second DCI includes a second slot group indicator and a second PDSCH-to-HARQ_feedback timing indicator, wherein the second slot group indicator is equal to the first slot group indicator, and wherein the second PDSCH-to-HARQ_feedback timing indicator is an applicable value;
    determining, based on the first PDSCH-to-HARQ_feedback timing indicator, that a first HARQ feedback information corresponding to the first PDSCH is to be transmitted in a first uplink slot, wherein a slot number of the first uplink slot is related to the second PDSCH-to-HARQ_feedback timing indicator; and
    transmitting the first HARQ feedback information corresponding to the first PDSCH in the first uplink slot.

2. The method of claim 1, wherein the first slot group indicator is a 1-bit value.

3. The method of claim 1, wherein the first downlink slot is within a first channel occupancy time (COT).

4. The method of claim 3, wherein the first uplink slot is within the first COT.

5. The method of claim 3, wherein the first uplink slot is outside of the first COT.

6. The method of claim 1, wherein:
    the second DCI schedules a second PDSCH in a second downlink slot that is within the second slot group; and
    the method further comprises:
        receiving, the second PDSCH, wherein the second PDSCH is received during the second downlink slot, and wherein the second PDSCH is received as scheduled according to the second DCI;
        determining, based on the second DCI, that a second HARQ feedback information corresponding to the second PDSCH is to be transmitted in a second uplink slot; and
        transmitting the second HARQ feedback information corresponding to the second PDSCH in the second uplink slot.

7. The method of claim 6, wherein the first uplink slot and the second uplink slot are within a first channel occupancy time (COT).

8. The method of claim 6, wherein the first uplink slot is within a first channel occupancy time (COT) and the second uplink slot is outside of the first COT.

9. The method of claim 6, wherein the first slot group indicator is equal to the second slot group indicator, and wherein the first uplink slot is the second uplink slot.

10. The method of claim 6, wherein the first slot group indicator is different from the second slot group indicator, and wherein the first uplink slot and the second uplink slot are different.

11. The method of claim 1, wherein HARQ feedback information corresponding to the first slot group is carried in a HARQ codebook.

12. The method of claim 11, further comprising:
    determining, based on the HARQ codebook, that a second HARQ feedback information corresponding to a second PDSCH is to be transmitted in a second uplink slot, wherein the second DCI schedules a second PDSCH in a second downlink slot that is within the first slot group.

13. The method of claim 11, wherein the HARQ codebook has a dynamic size.

14. The method of claim 11, wherein the HARQ codebook has a pre-determined size.

15. The method of claim 14, wherein the HARQ codebook stores one or more padding bits following encoding of the HARQ feedback information corresponding to the first slot group.

16. The method of claim 14, wherein the pre-determined size of the HARQ codebook is based on at least one of a maximum downlink HARQ process number, a number of configured serving cells, or a maximum code block grouping (CBG) number.

17. The method of claim 1, wherein the slot number of the first uplink slot is a sum of the second PDSCH-to-HARQ_feedback timing indicator and a slot number of a second downlink slot.

18. The method of claim 1, wherein determining that the first HARQ feedback information corresponding to the first PDSCH is to be transmitted in the first uplink slot is further based on a previous HARQ codebook for a previous slot group before the first slot group.

19. The method of claim 1, wherein the first uplink slot is the second uplink slot.

20. The method of claim 1, wherein the first PDSCH-to-HARQ_feedback timing indicator includes a DCI field, and wherein the DCI field maps to the inapplicable value.

21. An apparatus for hybrid automatic repeat request (HARQ) configuration, the apparatus comprising:
    one or more receivers;
    one or more transmitters; and
    memory storing thereon instructions that, as a result of being executed by a processor, cause the processor to:
        receive, using the one or more receivers, a first downlink control information (DCI), wherein the first DCI schedules a first physical downlink shared channel (PDSCH) in a first downlink slot that is within a first slot group, wherein the first DCI includes the first slot group indicator identifying the first slot group and a first PDSCH-to-HARQ_feedback timing indicator, and wherein the first PDSCH-to-HARQ_feedback timing indicator is an inapplicable value;
        receive, using the one or more receivers, the first PDSCH, wherein the first PDSCH is received during the first downlink slot, and wherein the first PDSCH is received as scheduled according to the first DCI;
        receive, using the one or more receivers, a second DCI, wherein the second DCI is received after the first DCI, wherein the second DCI includes a second slot group indicator and a second PDSCH-to-HARQ_feedback timing indicator, wherein the second slot group indicator is equal to the first slot group indicator, and wherein the second PDSCH-to-HARQ_feedback timing indicator is an applicable value;

determine, based on the first PDSCH-to-HARQ_feedback timing indicator, that a first HARQ feedback information corresponding to the first PDSCH is to be transmitted in a first uplink slot, wherein a slot number of the first uplink slot is related to the second PDSCH-to-HARQ_feedback timing indicator; and transmit, using the one or more transmitters, the first HARQ feedback information corresponding to the first PDSCH in the first uplink slot.

22. The apparatus of claim 21, wherein the first slot group indicator is a 1-bit value.

23. The apparatus of claim 21, wherein the first downlink slot is within a first channel occupancy time (COT).

24. The apparatus of claim 23, wherein the first uplink slot is within the first COT.

25. The apparatus of claim 23, wherein the first uplink slot is outside of the first COT.

26. The apparatus of claim 21, wherein:
the second DCI schedules a second PDSCH in a second downlink slot that is within the second slot group; and
the instructions further cause the processor to:
receive, using the one or more receivers, the second PDSCH, wherein the second PDSCH is received during the second downlink slot, and wherein the second PDSCH is received as scheduled according to the second DCI,
determine, based on the second DCI, that a second HARQ feedback information corresponding to the second PDSCH is to be transmitted in a second uplink slot, and
transmit, using the one or more transmitters, the second HARQ feedback information corresponding to the second PDSCH in the second uplink slot.

27. The apparatus of claim 26, wherein the first uplink slot and the second uplink slot are within a first channel occupancy time (COT).

28. The apparatus of claim 26, wherein the first uplink slot is within a first channel occupancy time (COT) and the second uplink slot is outside of the first COT.

29. The apparatus of claim 26, wherein the first slot group indicator is equal to the second slot group indicator, and wherein the first uplink slot is the second uplink slot.

30. The apparatus of claim 26, wherein the first slot group indicator is different from the second slot group indicator, and wherein the first uplink slot and the second uplink slot are different.

31. The apparatus of claim 21, wherein HARQ feedback information corresponding to the first slot group is carried in a HARQ codebook.

32. The apparatus of claim 31, wherein the instructions further cause the processor to:
determine, based on the HARQ codebook, that a second HARQ feedback information corresponding to a second PDSCH is to be transmitted in a second uplink slot, wherein the second DCI schedules a second PDSCH in a second downlink slot that is within the first slot group.

33. The apparatus of claim 31, wherein the HARQ codebook has a dynamic size.

34. The apparatus of claim 31, wherein the HARQ codebook has a pre-determined size.

35. The apparatus of claim 34, wherein the HARQ codebook stores one or more padding bits following encoding of the HARQ feedback information corresponding to the first slot group.

36. The apparatus of claim 34, wherein the pre-determined size of the HARQ codebook is based on at least one of a maximum downlink HARQ process number, a number of configured serving cells, or a maximum code block grouping (CBG) number.

37. The apparatus of claim 21, wherein the slot number of the first uplink slot is a sum of the second PDSCH-to-HARQ_feedback timing indicator and a slot number of a second downlink slot.

38. The apparatus of claim 21, wherein determining that the first HARQ feedback information corresponding to the first PDSCH is to be transmitted in the first uplink slot is further based on a previous HARQ codebook for a previous slot group before the first slot group.

39. The apparatus of claim 21, wherein the first uplink slot is the second uplink slot.

40. The apparatus of claim 21, wherein the first PDSCH-to-HARQ_feedback timing indicator includes a DCI field, and wherein the DCI field maps to the inapplicable value.

* * * * *